United States Patent
Mandai et al.

(10) Patent No.: US 6,594,999 B2
(45) Date of Patent: Jul. 22, 2003

(54) COMBUSTOR, A GAS TURBINE, AND A JET ENGINE

(75) Inventors: Shigemi Mandai, Takasago (JP); Yutaka Kawata, Takasago (JP); Atsushi Maekawa, Takasago (JP); Katsunori Tanaka, Takasago (JP); Masaharu Nishimura, Takasago (JP); Soichiro Tomimoto, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/908,637

(22) Filed: Jul. 20, 2001

(65) Prior Publication Data

US 2002/0011070 A1 Jan. 31, 2002

(30) Foreign Application Priority Data

Jul. 21, 2000 (JP) ......................................... 2000-220832

(51) Int. Cl.⁷ ................................................. F02C 3/00
(52) U.S. Cl. ............................. 60/722; 60/752; 60/760; 60/725
(58) Field of Search ......................... 60/737, 742, 743, 60/752, 760, 722, 725

(56) References Cited

U.S. PATENT DOCUMENTS

| | | | | |
|---|---|---|---|---|
| 2,601,000 A | * | 6/1952 | Nerad | 60/760 |
| 3,169,367 A | * | 2/1965 | Husey | 60/760 |
| 3,169,369 A | * | 2/1965 | Holl | 60/760 |
| 4,199,936 A | * | 4/1980 | Cowan et al. | 60/725 |
| 5,237,813 A | * | 8/1993 | Harris et al. | 60/752 |
| 5,259,184 A | * | 11/1993 | Borkowicz et al. | 60/742 |
| 5,461,865 A | * | 10/1995 | Snyder et al. | 60/743 |
| 5,685,157 A | * | 11/1997 | Pandalai et al. | 60/725 |
| 5,778,676 A | * | 7/1998 | Joshi et al. | 60/742 |
| 5,813,232 A | * | 9/1998 | Razdan et al. | 60/737 |
| 6,530,221 B1 | * | 3/2003 | Sattinger et al. | 60/725 |

FOREIGN PATENT DOCUMENTS

| | | |
|---|---|---|
| EP | 0564184 | 10/1993 |
| JP | 6-18037 | 1/1994 |
| JP | 11-141878 | 5/1999 |

* cited by examiner

*Primary Examiner*—Michael Koczo
(74) *Attorney, Agent, or Firm*—Wenderoth, Lind & Ponack, L.L.P.

(57) ABSTRACT

A combustor can simultaneously reduce the amount of NOx exhaust and combustion oscillation. The combustor has an internal cylinder which accommodates a premixing nozzle and an external cylinder which accommodates the internal cylinder, and includes an air flow passage which supplies air from a compressor to the premixing nozzle. The air flow passage is provided with a punched metal plate near the maximum velocity fluctuation position whereat the velocity fluctuation of the air flow increases to a maximum.

16 Claims, 16 Drawing Sheets

AIR FLOW ⇒

AIR FLOW ⇒

AIR FLOW ⇒

AIR FLOW ⇒

AIR FLOW ⇒

CONCENTRATION

COMBUSTOR, A GAS TURBINE, AND A JET ENGINE

BACKGROUND OF THE INVENTION

1. Field of the Invention

This invention relates to a combustor that is preferably used to reduce an amount of NOx exhaust and the combustion oscillation, and to a gas turbine and a jet engine which are equipped with the combustor.

2. Description of Related Art

Reduction of Nox emissions is required, in view of recent environmental problems, when a gas turbine and a jet engine are used.

A gas turbine and a jet engine each include a compressor, a combustor, and a turbine. The compressor and the turbine are connected to each other by means of a main shaft. The combustor is connected to an outlet of the compressor.

A working fluid gas is compressed by the compressor in order to supply a high-pressure gas to the combustor. The high-pressure gas is heated to a predetermined turbine inlet temperature by the combustor in order to supply a high-pressure and high-temperature gas to the turbine. The high-temperature and high-pressure gas is expanded in a cylinder of the turbine, as the high-temperature and high-pressure gas passes between a stator blade and a rotor blade disposed on the main shaft of the turbine. The main shaft is thereby rotated that a shaft output is generated. In a gas turbine of this type, a shaft output can be obtained by subtracting the power consumed for rotating the compressor. Therefore, the shaft output can be used as a driving source by connecting an electric power generator to the main shaft at the opposite side of the turbine, for example.

The jet engine uses the output in the form of the kinetic energy of a high-velocity jet to directly propel an aircraft.

The development of the gas turbine and the jet engine described above has been promoted in order to reduce emissions of NOx and the like in view of recent environmental problems. In a premixing combustion mode, fuel gas and air are premixed. When the fuel gas is non-uniformly premixed, a high concentration area of the fuel gas is generated. At the high concentration area, a flame is generated which has a temperature that is locally highly elevated, At the high temperature portion of the flame, a large amount of NOx is emitted, so that the total amount of NOx exhaust is increased. Therefore, it is effective to make uniform the mixed ratio of the fuel gas and the air, in order to reduce the amount of NOx exhaust.

A gas turbine combustor which can premix the fuel gas and the air at a subsequently equal ratio is disclosed in Japanese Unexamined Patent Application, First Publication No. Hei 11-141878, for example. The gas turbine combustor is provided with a straightening plate, which has a plurality of small through holes, on the air intake side of the main body of the gas turbine combustor. The straightening plate makes the air, which is supplied to the gas turbine combustor, flow uniformly. Thereby, the fuel gas and the air can be premixed uniformly.

In the following, the gas turbine combustor will be briefly explained with reference to FIGS. 19 and 20. In FIG. 19, a combustor 1, an internal cylinder 2, a premixing nozzle 3, a pilot burner 4, a main burner 5, and a top hat 6 are shown. The premixing nozzle 3 includes the pilot burner 4 and the main burner 5. An air flow passage 7 is formed between the internal cylinder 2 and the top hat 6. In the air flow passage 7, air is supplied from the compressor.

The direction of the air flow is shown by arrows in FIG. 19. That is, the air flow supplied from the compressor is reversed to be supplied to an inlet of the air flow passage 7. Then, the air flow supplied from an outlet of the air flow passage 7 is reversed to be supplied to the combustor 1. Near the outlet of the air flow passage 7, a straightening plate 8 having a plurality of small through holes 8a is provided so as to cover the outlet of the air flow passage 7. The air flow passing through the straightening plate 8 is made uniform, and is supplied to the tip end positions of the pilot burner 4 and respective main burners 5. Therefore, the fuel gas and the air are uniformly premixed so that the amount of NOx exhaust can be reduced.

By using the gas turbine combustor, the premixed gas is ignited to form a flame which burns in a thin narrow area and in a short time. Thereby, the calorific value generated per unit area is increased in the gas turbine combustor. By the increase of the calorific value, combustion oscillation is generated. When the combustion oscillation is generated, the combustion oscillation is propagated as pressure waves, and resonates as an acoustic system consisting of casings of the combustor, the gas turbine, and the like. Therefore, there is a danger of internal pressure fluctuation as the combustion oscillation is enlarged. In this case, it is difficult to operate normally the gas turbine combustor and the like.

Moreover, in the gas turbine combustor, the turbulence of the air flow supplied from the compressor tends to be increased, and to be maintained for a long time. Thereby, the turbulence during the combustion is so strong that the combustion tends to be unstable. When combustion is unstable, combustion oscillation is generated. The combustion oscillation causes internal pressure fluctuation in the combustor. Then the pressure waves caused by the internal pressure fluctuation are propagated and resonate with the acoustic system consisting of the casings of the combustor, the gas turbine, and the like. Thereby, the internal pressure fluctuation causing the combustion oscillation may be enlarged. Therefore it becomes difficult to operate normally the gas turbine combustor.

SUMMARY OF THE INVENTION

The present invention has been made to solve the problems described above. An object of the present invention is to provide a combustor, which can reduce the amount of NOx exhaust and the combustion oscillation at the same time, and is provided with a gas turbine and a jet engine.

In order to achieve the object described above, the present invention utilizes the following constitution.

A combustor according to the present invention includes a combustion unit, an air flow passage through which air is supplied to the combustion unit from a compressor, and a velocity fluctuation absorption member which is provided in the air flow passage near the maximum velocity fluctuation position in the air flow passage where the velocity fluctuation of the air flow becomes maximum.

A combustor according to the present invention includes a premixing nozzle, a first cylindrical member which accommodates the premixing nozzle, a second cylindrical member which accommodates the first cylindrical member, and an air flow passage through which air is supplied from a compressor to the premixing nozzle and is accommodated in the second cylindrical member, and a velocity fluctuation absorption member which is provided in the air flow passage near the maximum velocity fluctuation position in the air flow passage where the velocity fluctuation of the air flow becomes maximum.

In these combustors, the velocity fluctuation absorption member may be disposed in the vicinity of the maximum velocity fluctuation position in the air flow passage in the range of $\pm \frac{1}{8}\lambda$, wherein $\lambda$ is a wavelength of the velocity fluctuation.

The velocity fluctuation absorption member may be disposed at an inlet of the air flow passage.

When the combustors described above are used, the air flow is supplied from the compressor to the combustion unit (the premixing nozzle) through the velocity fluctuation absorption member disposed near the maximum velocity fluctuation position in the air flow passage where the velocity fluctuation of the air flow becomes maximum. The velocity fluctuation absorption member provides resistance to the pressure waves of the combustion oscillation and to the turbulence of the air flow supplied from the compressor. Thereby, the pressure fluctuation is increased at the maximum velocity fluctuation position, and the difference between the velocity fluctuation and the pressure fluctuation is decreased. Thus, the pressure waves of the combustion oscillation and the turbulence of the air flow can be reduced. The velocity fluctuation absorption member also works as an acoustic damper which reduces the internal pressure fluctuation. The resonation of the combustion oscillation and the acoustic system can thereby be prevented, and increase of the combustion oscillation can also be prevented. The velocity fluctuation absorption member makes the air flow uniformly in the air flow passage, so that the velocity of the air flow is made uniform and the turbulence of the air flow is reduced. The amount of NOx exhaust can thereby be reduced. Thus the reduction of the NOx emissions and the combustion oscillation can be reduced at the same time and stable operation of the combustor can be achieved.

In the combustor, the velocity fluctuation absorption member used may be a punched metal plate, a net member, or a porous plate, which can cause a pressure loss of the air flow. Preferably, an aperture ratio of the velocity fluctuation absorption member may be no less than 35% with respect to the cross-sectional area of the velocity fluctuation absorption member in which apertures are formed, so that highly effective operation of the combustor is maintained.

In the combustor, the air flow passage may be provided with a straightening member for the air flow so that the air flow is made uniform and the axial velocity of the air flow is made uniform. The concentration distribution of the premixed gas is thereby made uniform so that the amount of NOx exhaust is reduced.

In the combustor, the premixing nozzle preferably includes a fuel discharge member which is fixed on a fuel supply conduit and includes a main body having an internal space which communicates with a fuel passage in the fuel supply conduit, fuel discharge outlets which communicate with the internal space and a trailing edge having a thickness of no more than 5 mm, or a flow passage block ratio of the fuel discharge member that is no more than 10% with respect to the cross-sectional area of the air flow passage in which the fuel discharge member is to be placed. By using the combustor, the generation of swirl downstream of the fuel discharge member is reduced, so that the concentration distribution of the premixed gas is made uniform.

In the combustor, the premixing nozzle preferably includes the fuel discharge member which is fixed on the fuel supply conduit and includes the main body having an internal space which communicates with the fuel passage in the fuel supply conduit, the fuel discharge outlets which communicate with the internal space, and the trailing edge, wherein the main body is a flat tube. By using the combustor, the generation of swirl downstream of the fuel discharge member is reduced, so that the concentration distribution of the premixed gas is made uniform.

A gas turbine according to the present invention includes a compressor which compresses air to generate a high-pressure gas, the combustor described above, which is connected to the compressor so as to be supplied with the high-pressure gas from the compressor, and which heats the high-pressure gas to generate a high-temperature and high-pressure gas, and a turbine which is connected to the combustor so as to be supplied with the high-temperature and high-pressure gas from the combustor, and which rotates an output shaft by expanding the high-temperature and high-pressure gas to generate a shaft output.

When the gas turbine is used, which includes the combustor provided with the velocity fluctuation absorption member, the velocity fluctuation absorption member provides the resistance to the pressure waves of the combustion oscillation and to the turbulence of the air flow supplied from the compressor. The pressure fluctuation is thereby increased at the maximum velocity fluctuation position, and the difference between the velocity fluctuation and the pressure fluctuation is decreased. The pressure waves of the combustion oscillation and the turbulence of the air flow can thereby be reduced. The velocity fluctuation absorption member also works as an acoustic damper which reduces the internal pressure fluctuation. The resonation of the combustion oscillation and the acoustic system can thereby be prevented, and increase of the combustion oscillation can be prevented. The velocity fluctuation absorption member wakes the air flow uniform, so that the velocity of the air flow is made uniform and the turbulence of the air flow is reduced. Thereby, the amount of NOx exhaust can be reduced. Thus, the reduction of the NOx emission and the combustion can be reduced at the same time, and the stable operation of the combustor can be achieved.

A jet engine according to the present invention includes a compressor which compresses air to generate a high-pressure gas, the combustor described above, which is connected to the compressor so as to be supplied with the high-pressure gas from the compressor, and which heats high-pressure gas to generate a high-temperature and high-pressure gas, and a turbine which is connected to the combustor so as to be supplied with the high-temperature and high-pressure gas from the combustor.

When the jet engine is used, which includes the combustor provided with the velocity fluctuation absorption member, the velocity fluctuation absorption member provides the resistance to the pressure waves of the combustion oscillation and the turbulence of the air flow supplied from the compressor. The pressure fluctuation is thereby increased at the maximum velocity fluctuation position, and the difference between the velocity fluctuation and the pressure fluctuation is decreased. The pressure waves of the combustion oscillation and the turbulence of the air flow can thereby be reduced. The velocity fluctuation absorption member also works as an acoustic damper which reduces the internal pressure fluctuation. The resonation of the combustion oscillation and the acoustic system can thereby be prevented, and the increase of the combustion oscillation can be prevented. The velocity fluctuation absorption member makes the air flow uniform, so that the velocity of the air flow is made uniform and the turbulence of the air flow is reduced. Thereby, the amount of NOx exhaust can be reduced. Thus, the reduction of the NOx emissions and the combustion oscillation can be reduced at the same time, and stable operation of the combustor can be achieved.

BRIEF DESCRIPTION OF DRAWINGS

FIG. 1A is a cross-sectional view of a key portion of the combustor, and FIG. 1B is a cross-sectional view of FIG. 1A.

FIG. 5A is a cross-sectional view of a key portion of the burner; FIG. 5B is a cross-sectional view of the fuel discharge member taken along the line 5B—5B of FIG. 5A; and FIG. 5C is a cross-sectional view of the burner taken along the line 5C—5C of FIG. 5A.

FIG. 7A is a cross-sectional view of a first modification; FIG. 7B is a cross-sectional view of a second modification; FIG. 7C is a cross-sectional view of a third modification; FIG. 7D is a cross-sectional view of a fourth modification, and FIG. 7E is a cross-sectional view of a fifth modification.

FIG. 9A is a cross-sectional view, and FIG. 9B is a cross-sectional view taken along the line 9B—9B of FIG. 9A.

FIG. 11A is a cross-sectional view of a key portion of the fuel discharge member, and FIG. 11B is a cross-sectional view taken along the line 11B—11B of FIG. 11A.

FIG. 12A is a schematic representation which illustrates the relationship between the fuel discharge member and the main swirlers, wherein the fuel discharge member and the main swirlers are staggered; and FIG. 12B is a schematic representation which illustrates the relationship between the fuel discharge member and the main swirlers, wherein the fuel discharge member and one main swirler are arranged in the same line.

FIG. 15A shows a key portion of an air flow passage provided with a velocity fluctuation absorption member of the combustor, FIG. 15C shows a key portion of the air flow passage formed a plurality of small outlets of the combustor; and FIG. 15B shows the combustor.

DETAILED DESCRIPTION OF THE INVENTION

In the following, embodiments according to the present invention will be explained with reference to the drawings.

First Embodiment

A gas turbine expands a high-temperature and high-pressure gas in the turbine and rotates the main shaft to generate a shaft output which is used as a driving force for an electric power generator and the like. A jet engine expands the high-temperature and high-pressure gas in the turbine and rotates the main shaft to exert kinetic energy of a high-velocity jet (exhaust), discharged from an outlet of the turbine, as a propelling force of an aircraft.

The main components of the gas turbine and the jet engine are a compressor, a combustor, and a turbine.

The compressor compresses a gas, that is air, which is introduced from an inlet thereof, as a working fluid in order to supply a high-pressure gas to the combustor that is connected to the outlet of the compressor. This compressor used is an axial compressor which is connected to the turbine through the main shaft. In the combustor, the high-pressure gas burns to generate at a high-temperature and high-pressure. Then, the high-temperature and high-pressure gas is supplied to the turbine.

Figure 1A:
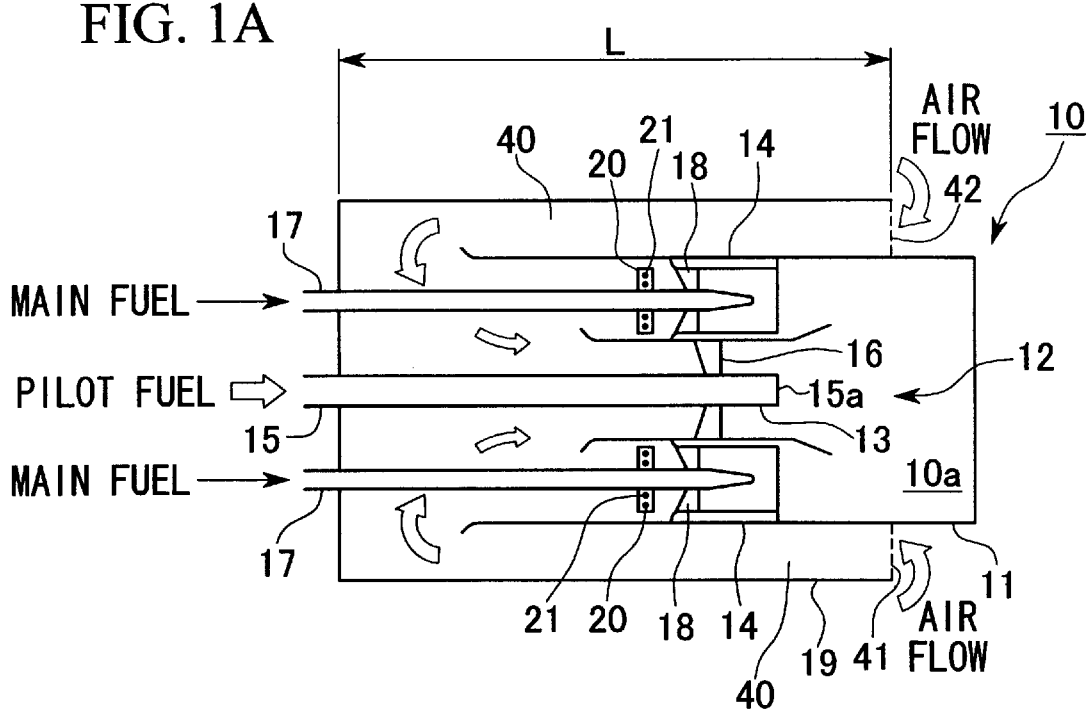
FIGS. 1A and 1B show a combustor of a first embodiment according to the present invention.
Figure 1B:
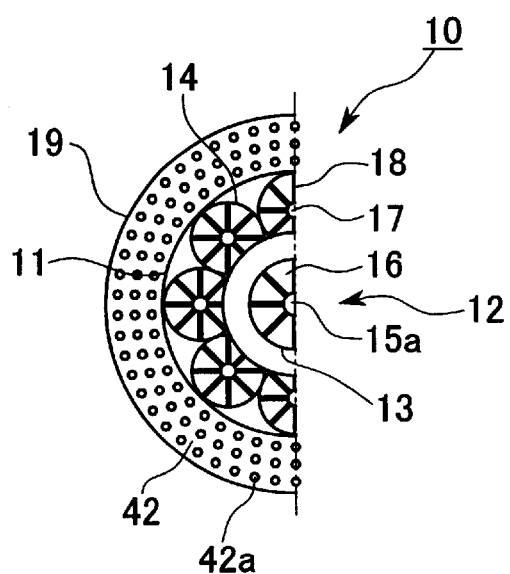

In the following, the combustor according to a first embodiment is described with reference to FIGS. 1A and 1B.

A combustor 10 is equipped with a premixing nozzle 12 along a central axis of a first cylindrical member (an internal cylinder) 11. The internal cylinder 11 is a circular cylinder of which both ends are open. The internal cylinder 11 accommodates the premixing nozzle 12. The premixing nozzle 12 includes a pilot burner 13 and a plurality of main burners 14. The pilot burner 13 is provided at the central position which coincides with the central axis of the premixing nozzle 12. The plurality of main burners 14 are disposed at even intervals so as to surround the pilot burner 13. Therefore, the central axis of the pilot burner 13 is the central axis of the internal cylinder 11. In FIG. 1B, eight main burners 14 are disposed so as to surround the pilot burner 13, wherein the main burners 14 each have the same form.

The pilot burner 13 of the premixing nozzle 12 includes a pilot fuel tube 15 and pilot swirlers 16. The pilot fuel tube 15 is a circular cylinder of which one end is connected to a fuel supply source which is not shown, so that pilot fuel is supplied to the pilot fuel tube 15 from the fuel supply source. At the other end of the pilot fuel tube 15, a pilot fuel nozzle 15a is formed so as to open toward a combustion chamber 10a of the combustor 10 which is formed on the internal cylinder 11. Thus, the pilot fuel is supplied to the combustion chamber 10a from the pilot fuel nozzle 15a. The pilot swirlers 16 have a twisted shape, and are fixed on the pilot fuel tube 15 at even intervals in the circumferential direction. In FIG. 1B, the pilot swirlers 16 are disposed on the pilot fuel tube 15 at intervals of 45° in the circumferential direction. The pilot swirlers 16 give a swirling motion to the air flow (shown by an arrow) which passes through the pilot swirlers 16. Thereby, the air flow is emitted to the surroundings of the pilot fuel nozzle 15a.

The pilot fuel supplied from the pilot fuel nozzle 15a burns the swirled flow of air as combustion gas to generate flames in the combustion chamber 10a. Thus, flames generated by the pilot burners 13 are used to generate flames at the main burner 14.

The main burner 14 of the premixing nozzle 12 includes a fuel supply conduit 17, fuel discharge members 20, and swirlers 18. The fuel supply conduit 17 is a circular cylinder in which a fuel passage is formed. One end of the fuel supply conduit 17 is connected to a fuel supply source, which is not shown, in order to supply main fuel to the fuel supply conduit 17. The other end of the fuel supply conduit 17 is closed. The fuel discharge members 20 are fixed on the fuel supply conduit 17 at even intervals in the circumferential direction. The fuel discharge member 20 includes a main body having an internal space which communicates with the fuel supply conduit 17 and fuel discharge outlets 21 which communicate with the internal space so as to discharge the main fuel into the airflow. The swirlers 18 have a twisted shape and are fixed on the fuel supply conduit 17 at even intervals in the circumferential direction. In FIG. 1B, the swirlers 18 are disposed on the fuel supply conduit 17 at intervals of 45° in the circumferential direction The swirlers 18 are disposed downstream of the fuel discharge members 20. The swirlers 18 give a swirling motion to the air flow passing at the peripheral portion of the fuel supply conduit 17. In FIG. 1B, eight main burners 14 contact each other and surround the pilot burner 13.

Thus, the main burners 14 discharge the main fuel gas, which is introduced through the fuel supply conduit 17 to a fuel discharge outlet 21, into the air flow from the fuel discharge outlet 21. Thereby, the fuel gas and the air are premixed so that a premixed gas is generated. When the premixed gas passes through the swirlers 18, the premixed gas is swirled by the swirlers 18, and subsequently emitted to the combustion chamber 10a of the combustor 10. The premixed gas is led to the surroundings of the pilot burner 13 from the eight main burners 14 in the combustion chamber 10a. The premixed gas is ignited by the flames generated by the pilot burner 13 described above so that a high-temperature gas is generated. The generated gas is emitted from apertures which are formed at one end of the internal cylinder 11.

Figure 19:
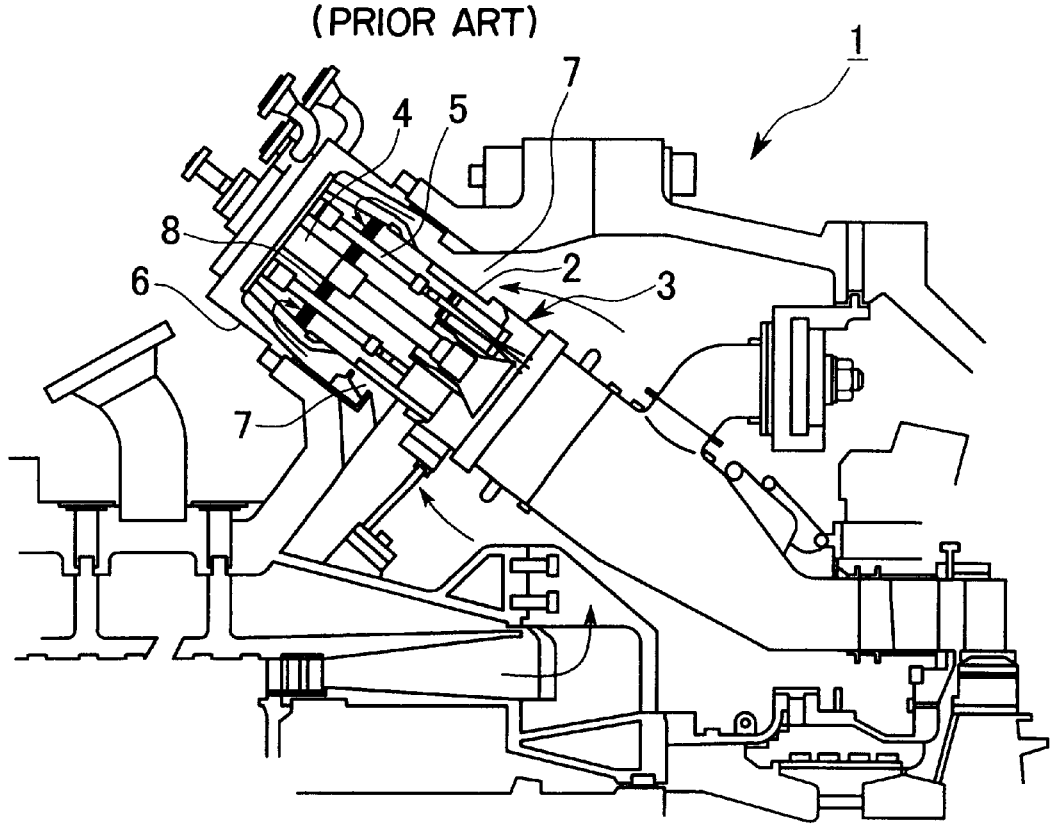
FIG. 19 is a cross-sectional view of a key portion of a combustor according to the prior art.
Figure 20:
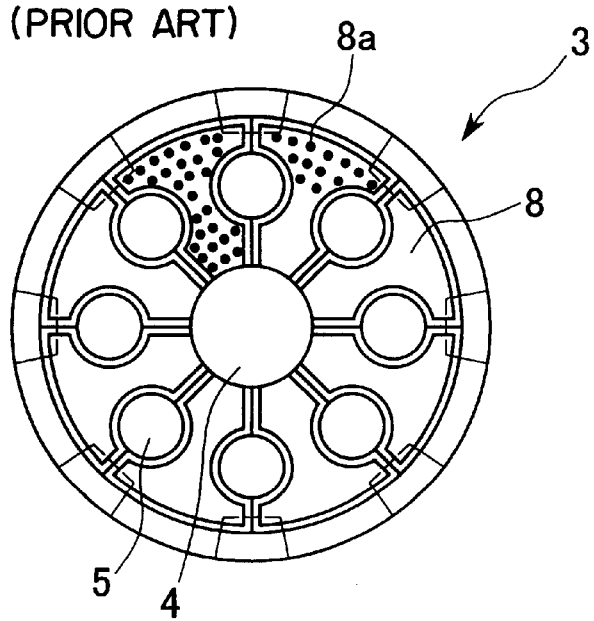
FIG. 20 is a cross-sectional view of FIG. 19.

A second cylindrical member (an external cylinder) 19 is disposed coaxially on the outer side of the internal cylinder 11. The external cylinder 19 is a circular cylinder of which one end is opened and another end is closed. The external cylinder 19 accommodates the internal cylinder 11 and an air flow passage 40. The air flow passage 40 is formed so as to reverse the air flow direction at the closed end of the external cylinder 19 and supply the air to the premixing nozzle 12 from the compressor. The external cylinder 19 corresponds to the top hat 6 shown in FIG. 19. As shown in FIG. 1B, a ring-shaped punched metal plate 42 is disposed as a velocity fluctuation absorption ember at an inlet 41 of the air flow passage 40 supplied from the compressor. The punched metal plate 42 is formed by a flat plate having a plurality of distribution holes 42a whose cross-sectional shape is an annular shape. The cross-sectional shape of the distribution holes 42a is not limited to an annular shape. When the air passes through the distribution holes 42a of the punched metal plate 42, the punched metal plate 42 causes a pressure loss of the air flow by providing resistance to the pressure waves.

At the inlet 41 of the air flow passage 40, the cross sectional area in which the air flow is supplied from the compressor is suddenly decreased. Therefore, the air is forced into the air flow passage 40 through the inlet 41, and then the air flow is supplied to the combustor 10.

The punched metal plate 42 described above is used to provide a suitable flowing resistance to the air flow so as to cause the pressure loss of the air flow. In the punched metal plate 42, the plurality of distribution holes 42a is formed to permit the air flow passing through the punched metal plate 42 into the air flow passage 40. Preferably, the aperture ratio of the punched metal plate 42 is no less than 35% with respect to the cross-sectional area of the punched metal plate 42 in which the distribution holes 42a are formed so that the excessive pressure loss of the air flow is prevented. In place of the punched metal plate 42, a net member, a porous plate, and the like can be used.

Figure 2:
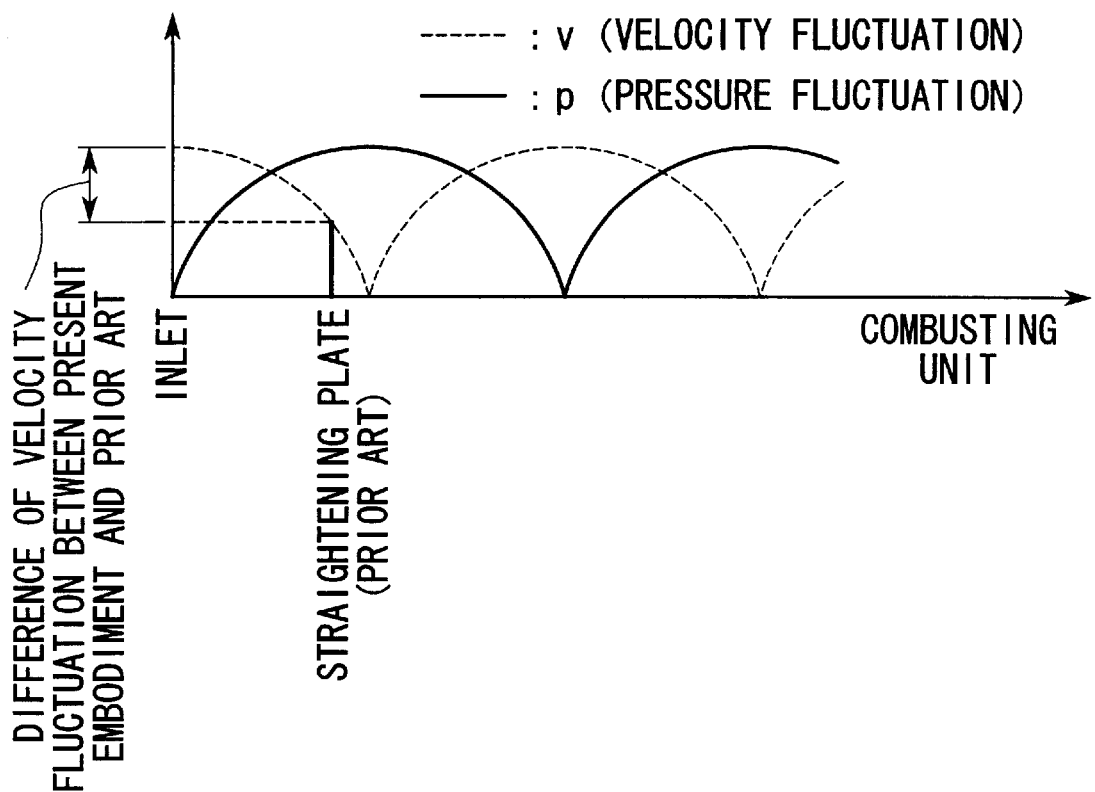
FIG. 2 is a graph which shows the relationship between the velocity fluctuation v and the pressure fluctuation p of the air flow which is supplied from an inlet of an air flow passage to the combustor.

On the vertical axis of FIG. 2, the velocity fluctuation v of the air flow supplied from the compressor is shown by a broken line, and the pressure fluctuation p of the air flow is shown by a solid line. In the horizontal axis of FIG. 2, the distance from the inlet 41 to the position, wherein the velocity fluctuation v or the pressure fluctuation p is measured, is shown. The phase of the velocity fluctuation v is shifted about 90 degrees with respect to the phase of the pressure fluctuation p. The wavelength of the velocity fluctuation v is the same as that of the pressure fluctuation p.

At the inlet 41 of the air flow passage 40, the velocity fluctuation v reaches to the maximum, and the pressure fluctuation p reaches to the minimum, because the cross-sectional area in which the air flow is supplied from the compressor is suddenly decreased. The velocity fluctuation v and the pressure fluctuation p respectively reach to the minimum or the maximum in a period of ½λ, λ indicating the wavelength thereof. Thus, when the pressure fluctuation p reaches to the maximum, the velocity fluctuation v reaches to the minimum.

When the punched metal plate 42 is disposed as the velocity fluctuation absorption member at the position in the air flow passage 40 wherein the velocity fluctuation v of the air flow becomes maximum, the pressure fluctuation p of the air flow passing through the punched metal plate 42 is increased. Therefore, the pressure fluctuation p of the air flow is also increased at the position in the air flow passage in which the velocity fluctuation v of the air flow is increased. Thus, the difference between the pressure fluctuation p and the velocity fluctuation v is reduced. Thereby, the generation of pressure waves of the air flow and the turbulence is reduced.

Figure 3:
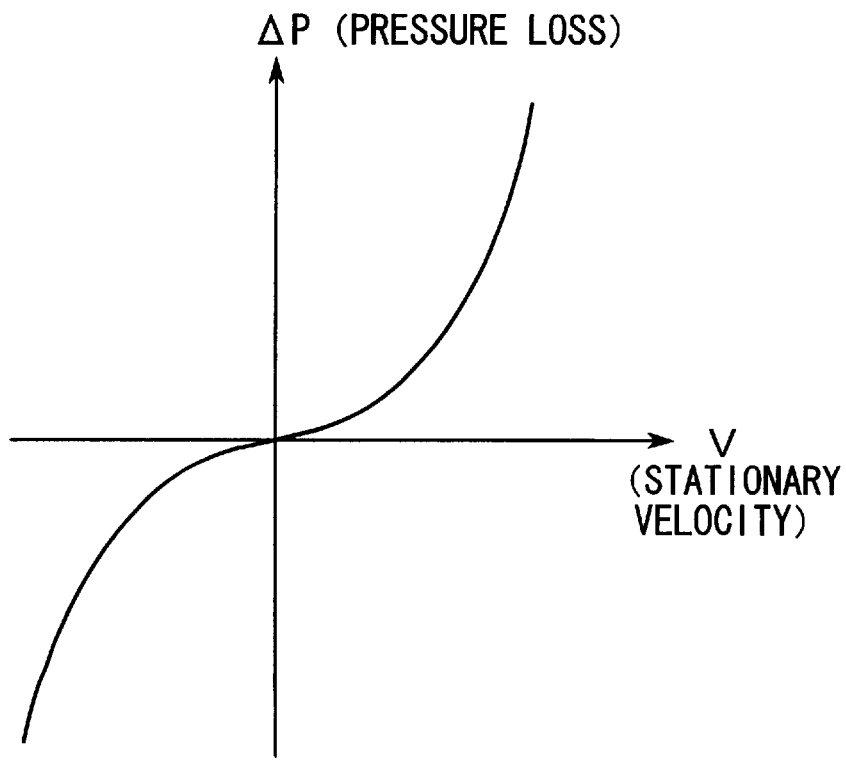
FIG. 3 is a graph which shows the relationship between the stationary velocity V and the pressure loss ΔP of the air flow.

The relationship between the stationary velocity V and the pressure loss ΔP is determined in accordance with the form, the aperture ratio, or the like of the punched metal plate 42, as shown in FIG. 3. The aperture ratio of the punched metal plate 42 shows a ratio of the entirety of cross-sectional area of the distribution holes 42a with respect to the cross-sectional area of the punched metal plate 42 in which the distribution holes 42a are formed. The pressure loss ΔP shows the pressure variation of the air flow passing through the punched metal plate 42. As shown in FIG. 3, the increase of the pressure loss ΔP can be reduced by selecting the stationary velocity V. Therefore, excessive pressure loss of the air flow can be prevented. Moreover, the punched metal plate 42 makes the axial velocity of the air flow uniform.

Although the punched metal plate 42 is preferably disposed at the inlet 41 of the air flow passage 40 in which the velocity fluctuation v first becomes maximum as shown in FIG. 2, the punched metal plate 42 may be disposed near the maximum velocity fluctuation position in the air flow passage 40 where the velocity fluctuation v reaches the maximum. That is, the punched metal plate 42 may be disposed on the vicinity of the maximum velocity fluctuation position in the air flow passage 40 in the range of ±⅛λ, wherein λ shows the wavelength of the velocity fluctuation v.

When the air flow supplied from the compressor is made uniform by passing through the punched metal plate 42, the turbulence is reduced and the axial velocity is substantially made uniform. By supplying the air flow made uniform by the punched metal plate 42, to the combustor 10, the combustor is made stable, so that the combustion oscillation can be prevented in the combustor 10. Thereby, the propagation of the pressure waves caused by the combustion oscillation can be reduced. Moreover, the punched metal plate 42 works as an acoustic damper, so as to reduce resonation between the pressure waves and the acoustic system. Therefore, the internal pressure fluctuation caused by the resonation between the pressure waves and the acoustic system can be reduced. Moreover, the punched metal plate 42 makes the axial velocity of the air flow uniform, and the concentration distribution of the premixed gas can be made uniform. Thereby, the flame temperature is also made uniform, so that the amount of NOx exhaust can be reduced.

The resonation between the pressure waves and the acoustic system consisting of the combustor 10 and a casing (not shown) can also be reduced by adjusting the length of the external cylinder 19 so as to change the wavelength of the acoustic system, that is, to change the inherent frequency of the acoustic system so that it does not match the frequency of the combustion oscillation. Thereby, an increase of oscillation combustion can be prevented. In this case, the punched metal plate 42 is preferably used to reduce the combustion oscillation.

In the following, the difference of the action between the punched metal plate 42 and a straightening plate of the prior art will be explained. An object for which the punched metal plate 42 is provided is not only to make the axial velocity of the air flow uniform, but also to reduce the combustion oscillation with high effectiveness. An object for which the straightening plate is provided is merely to make the axial velocity uniform. As shown in FIG. 2, the punched metal plate 42 of the present invention is disposed at the inlet 41 so as to reduce the combustion oscillation with high effectiveness. In contrast, the straightening plate of the prior art is disposed at a random position so as to make the axial velocity of the air flow uniform. When the straightening plate is disposed at a position where the velocity fluctuation of the air flow does not reach the maximum as shown in FIG. 2, the pressure fluctuation p is enlarged, so that the difference between the pressure fluctuation p and the velocity fluctuation p is further increased. Therefore, the turbulence of the air flow and the generation of the combustion oscillation cannot be prevented.

Figure 4A:
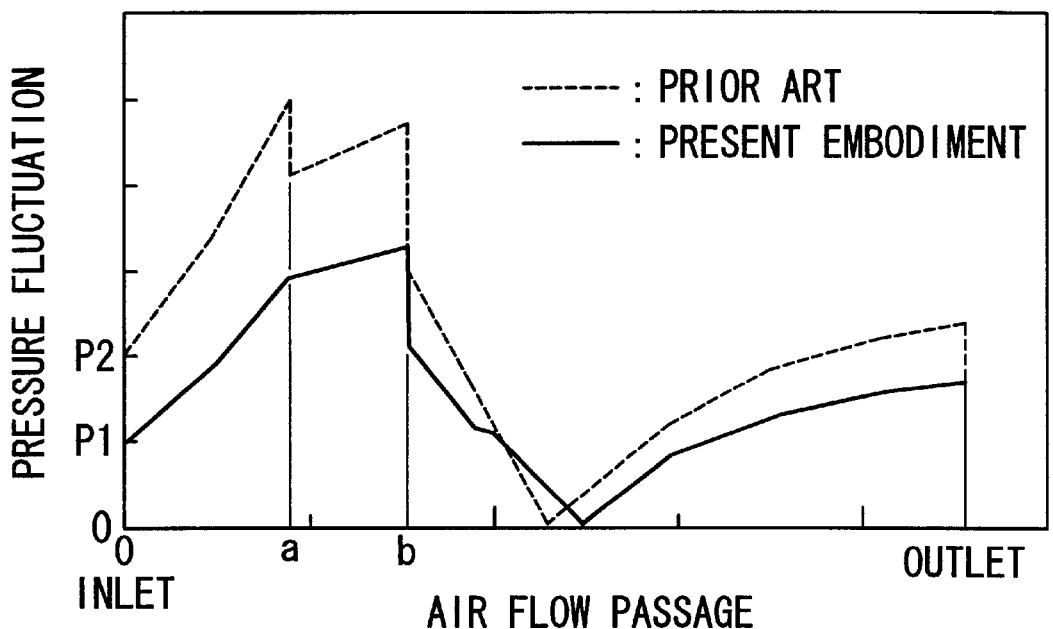
FIG. 4A is a graph which shows the pressure fluctuation of the air flow in the air flow passage.
Figure 4B:
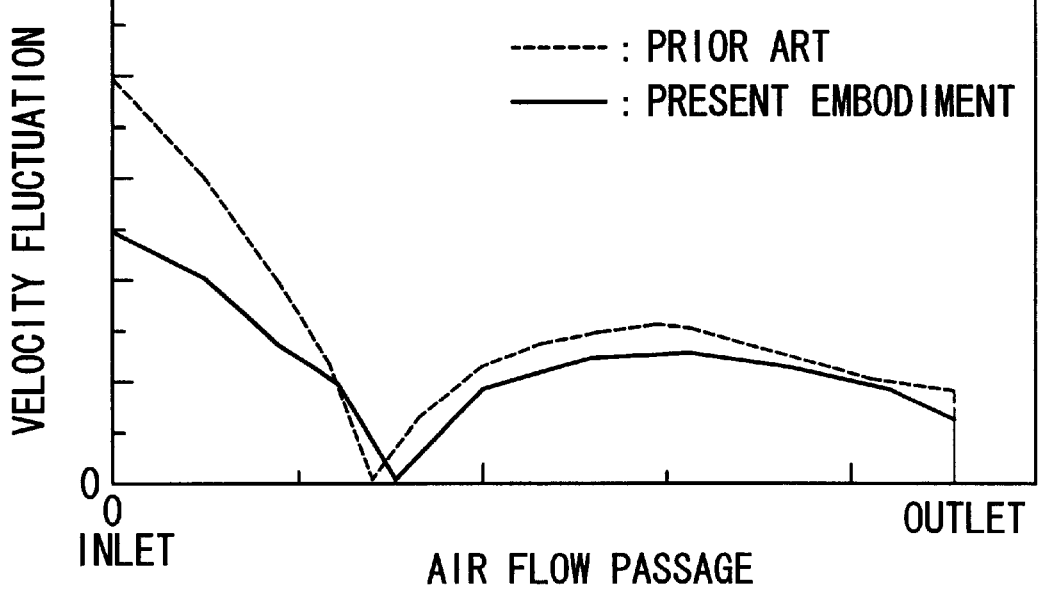
FIG. 4B is a graph which shows the velocity fluctuation of the air flow in the air flow passage.

With respect to the vertical axis of FIG. 4A, the pressure fluctuation of the air flow according to the first embodiment is shown by a solid line, and the pressure fluctuation of the air flow according to the prior art is shown by a broken line. On the horizontal axis of FIG. 4A, the distance from the inlet 41 to the position whereat the pressure fluctuation is measured is shown. With respect to the vertical axis of FIG. 4B, the velocity fluctuation of the air flow according to the present embodiment is shown by a solid line, and the velocity fluctuation of the air flow according to the prior art is shown by a broken line. On the horizontal axis of FIG. 4B, the distance from the inlet 41 to the position whereat the velocity fluctuation is measured is shown. In the prior art, the straightening plate is disposed at position 'a' on the horizontal axis and swirlers are disposed at position 'b' on the horizontal axis. In the present embodiment, the punched metal plate 42 is disposed at the inlet 41 of the air flow passage, that is position '0' on the horizontal axis, and swirlers are disposed at position 'b' on the horizontal axis.

In position '0' on the horizontal axis in FIG. 4A, the pressure fluctuation P1 according to the present embodiment is low as compared with the pressure fluctuation P2 according to the prior art. Thereby, the pressure fluctuation according to the present embodiment is relatively low as compared with the pressure fluctuation according to the prior art. In position '0' on the horizontal axis in FIG. 4B, the velocity fluctuation according to the present embodiment is low as compared with the velocity fluctuation according to the prior art. That is because the punched metal plate 42 provides the resistance to the air flow.

In the following, the burner which is included as the main burner 14 by the premixing nozzle 12 will be explained in further detail.

Figure 5A:
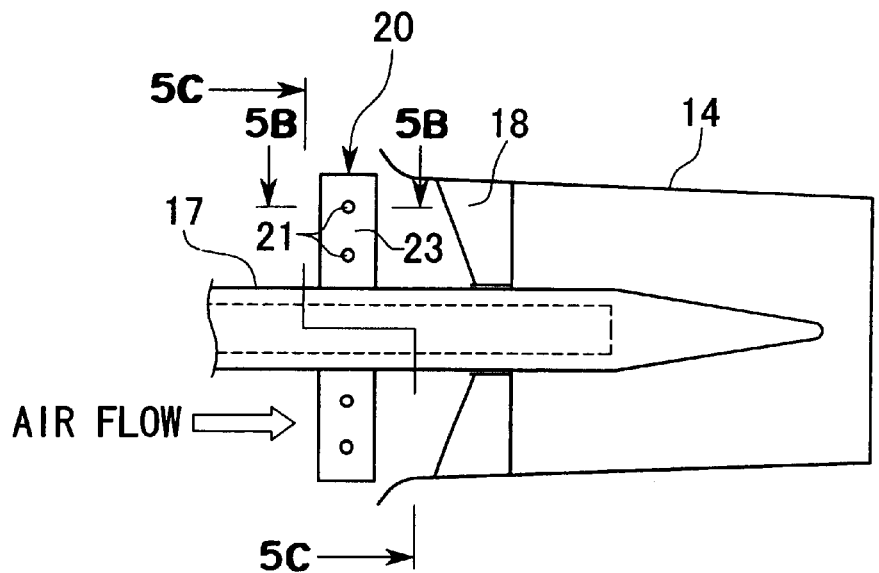
FIGS. 5A to 5C show a burner comprising a fuel discharge member of a first embodiment according to the present invention.

FIG. 5A shows the burner including the fuel supply conduit 17, the fuel discharge members 20, and the swirlers 18. The fuel discharge member 20 includes the main burner 14, the fuel supply conduit 17, the swirlers 18, and the fuel discharge outlets 21.

Figure 5B:
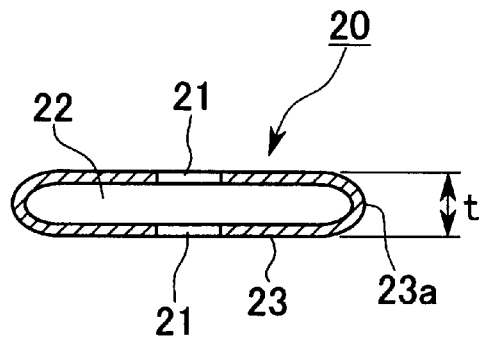

As shown in FIG. 5A, the fuel discharge members 20 are fixed on the fuel supply conduit 17 and radially protrude into the air flow passage (shown by an arrow), As shown in FIG. 5B, the fuel discharge member 20 include a main body 23 having an internal space 22, fuel discharge outlets 21, and a trailing edge 23a. The tip end of the main body 23 is closed, and the base end of the main body communicates with the fuel passage in the fuel supply conduit 17 through the internal space 22. internal space 22 is formed so as to communicate with the fuel passage in the fuel supply conduit 17 at the base end of the internal space 22. In FIG. 5A, two fuel discharge outlets 21 arc centrally aligned at opposite sides of the main body 23, respectively. The fuel discharge outlets 21 open toward a perpendicular or almost perpendicular direction to the air flow passage. The fuel discharge outlets 21 are formed so as to communicate with the internal space 22. However, the number of fuel discharge outlets 21 formed in the main body 23 is not limited to two, and the relationship between the fuel discharge outlets 21 is also not limited to being aligned.

In FIG. 5B, the main body 23 used is a flat tube of which the cross-sectional shape is a flat oval shape. The flat oval shape has two opposite linear portions disposed parallel to each other and both tip ends of the opposite linear portions are connected to each other forming semicircular portions as shown in FIG. 5B. The thickness t of the main body 23 in a direction perpendicular to the air flow passage is set to be no more than 5 mm or to be thin enough such that the flow passage block ratio thereof (the ratio of the cross-sectional area, wherein the trailing edge 23a of the fuel discharge member 23 occupies the air flow passage, to the total cross-sectional area of the air flow passage) is no more than 10%. As a result, the thickness of the trailing edge 23a of the main body 23 becomes thin.

Figure 5C:
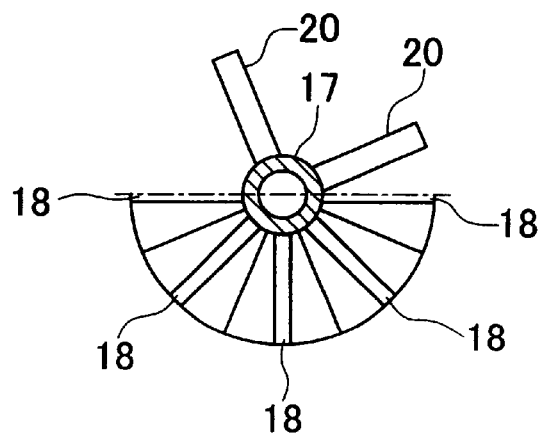

In FIG. 5C, four fuel discharge members 20 are disposed at intervals of 90° in the circumferential direction. The swirlers 18 are disposed at intervals of 45° in the circumferential direction downstream of the fuel discharge members 20 with respect to the flow of the air. The swirlers 18 have a twisted shape.

As described above, since the thickness t of the trailing edge 23a of the main body 23 is set to be no more than 5 mm or to be thin enough such that the flow passage block ratio thereof is no more than 10%, an interrupted effective area of the air flow passage, wherein the air flow is interrupted by the fuel discharge member 20 fixed on the fuel supply conduit, is decreased so that the flow of the premixed gas is made uniform. Thus, a negative pressure area, caused by the interruption of the flow of the premixed gas by the fuel discharge member 20 and formed downstream of the trailing edge 23a, is decreased, so that the generation of swirls caused by the negative pressure area, wherein the air flow is entrained, is reduced.

Thereby, the turbulence of the velocity distribution of the air flow is decreased at the downstream side of the fuel discharge member 20. Thus, since the penetration force of the fuel gas discharged from the fuel discharge outlet 21 can be maintained approximately constant, the concentration distribution of the fuel gas in the premixed gas can be constantly maintained in spite of the quality or the quantity of the fuel gas in the premixed gas.

Since four fuel discharge members 20 are disposed at intervals of 90° in the circumferential direction and the plurality of fuel discharge outlets 21 are disposed respectively on both sides of the fuel discharge members 20, the circumferential concentration distribution of the fuel gas is made uniform. Moreover, since two fuel discharge outlets 21 are disposed radially in a line on the opposite sides of the fuel discharge member 20, the radial concentration distribution of the fuel gas is made uniform. The number of fuel discharge members 20 and the arrangement of the fuel discharge members 20 may be suitably decided.

Figure 6:
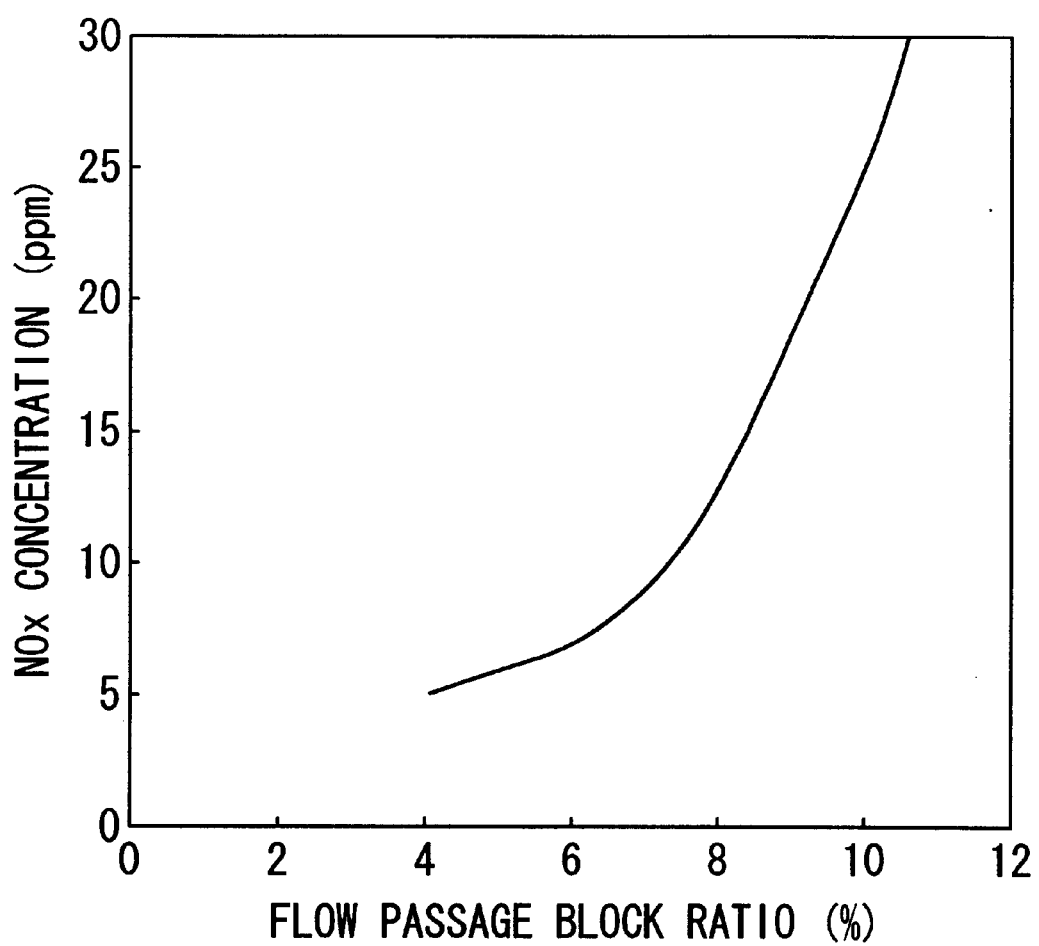
FIG. 6 is a graph which shows the relationship between the flow passage block ratio of a fuel discharge member and the NOx concentration.

In FIG. 6, experimental results show the relationship between the flow passage block ratio of the fuel discharge members 20 and the concentration of NOx exhausted. When the flow passage block ratio of the fuel discharge members 20 is increased, the concentration of NOx exhausted is also increased.

In the United States, the concentration of NOx exhausted is restricted to be no greater than 25 ppm. According to the experimental results shown in FIG. 6, the flow passage block ratio of the fuel discharge members 20 should be set to no more than 10% to satisfy the restriction of the concentration described above. When the flow passage block ratio of the fuel discharge members 20 is set to 7%, the concentration of NOx exhausted is 9 ppm.

The cross-sectional shape of the main body 23 described above may be another modified shape other than the flat oval shape shown in FIG. 5B.

Figure 7A:
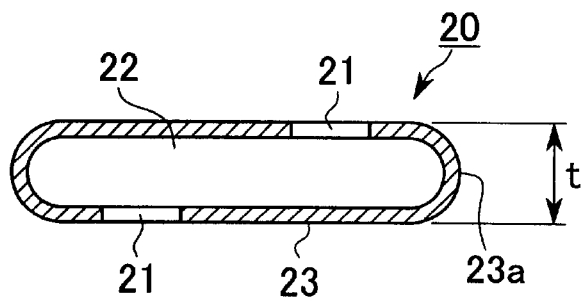
FIGS. 7A to 7E show respective modified cross-sectional shapes of the fuel discharge member of a first embodiment according to the present invention.

In a first modification shown in FIG. 7A, a flat tube, wherein the cross-sectional shape is a flat oval shape, is used, and two fuel discharge outlets 21 are disposed on both sides and staggered with respect to each other in the direction of the air flow, that is, in the axial direction of the fuel supply conduit 17. Thus, interaction between the fuel discharge outlets 21 can be reduced so that the fuel gas is constantly supplied.

Figure 7B:
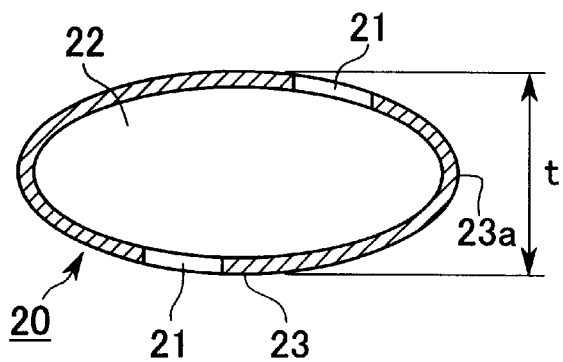

In a second modification shown in FIG. 7B, a flat tube, wherein the cross-sectional shape is an elliptical shape, is used, and the opposite sides in which the fuel discharge outlets 21 are disposed, are curved.

Figure 7C:
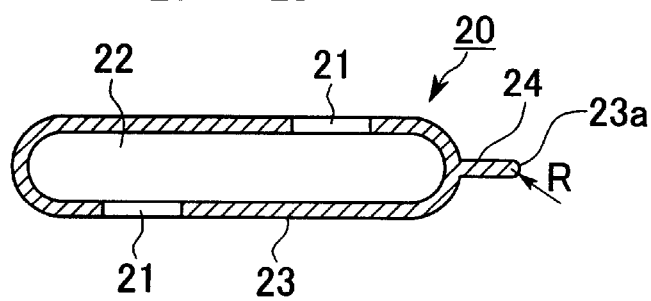

In a third modification shown in FIG. 7C, the trailing edge 23a is formed with a protruding portion 24 disposed on the end of the trailing edge side of the first modification. In this case, the protruding portion 24 may be formed into a semicircle of which the radius R is small enough so that the thickness t of the trailing edge 23a is no more than 5 mm or the flow passage block ratio of the fuel discharge member is no more than 10% with respect to the cross-sectional area of the air flow passage in which the fuel discharge member 20 is to be placed. Thereby, the internal space 22 of the main body 23 has a large cross-sectional shape, so that a large flow of the fuel gas can be easily maintained. Moreover, the generation of swirls at the downstream side is prevented, so that the fuel concentration distribution can be made uniform.

Figure 7D:
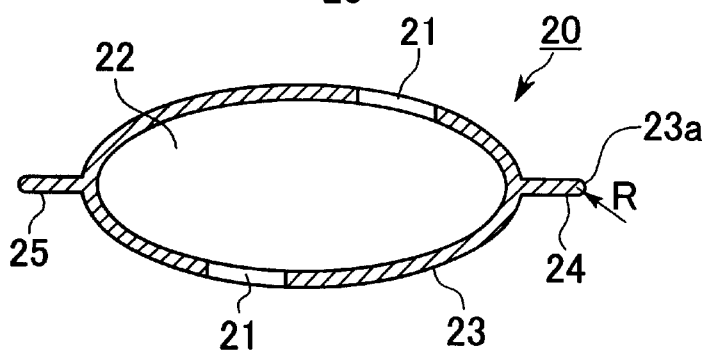

In a fourth modification shown in FIG. 7D, protruding portions 24 and 25 are disposed at opposite sides to form the trailing edge 23a and a leading edge of the fuel discharge member 20 according to the second modification, and thereby the generation of swirls downstream of the fuel discharge member 20 is satisfactorily prevented. These protruding portions 24 and 25 may be disposed in another type of fuel discharge member of which the cross-sectional shape is a flat oval shape or a circular shape, for example.

Figure 7E:
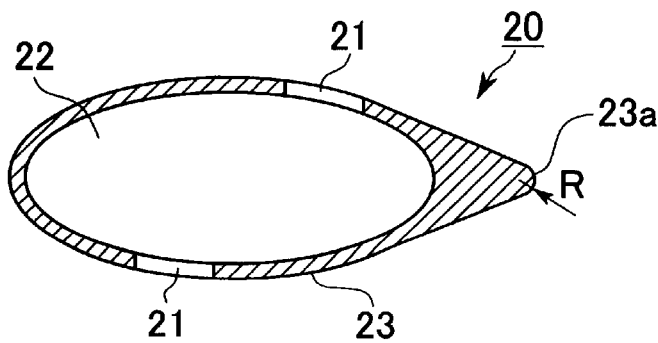

In a fifth modification shown in FIG. 7E, the trailing edge 23a is thin enough such that the thickness of the trailing edge 23a is no more than 5 mm or the flow passage block ratio of the fuel discharge member 20 is no more than 10% (R<2.5 mm). The cross-sectional shape of the main body 23 is a wing shape, and the cross-sectional shape of the internal space 22 is an elliptical shape. In this case, the generation of swirls is suppressed as described above.

The cross-sectional shape of the internal space 22 is not limited to an elliptical shape, and may be a flat oval shape or an annular shape.

Second Embodiment

In the following, a burner including a fuel supply conduit 17, a fuel discharge member 30, and swirlers 18 of the second embodiment will be explained with reference to FIGS. 8A, and 8B. In this case, the same members as those of the first embodiment are indicated by the same reference numbers, and descriptions of the same members are omitted.

Figure 8A:
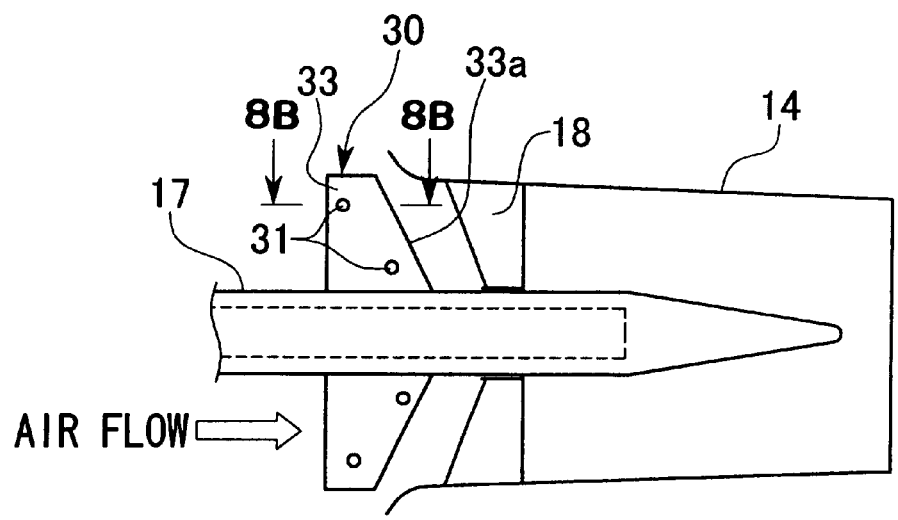
FIG. 8A is a cross-sectional view of a key portion of a burner comprising a fuel discharge member of a second embodiment according to the present invention.

In FIG. 8A, fuel discharge members 30 and swirlers 18 are fixed on the fuel supply conduit 17.

The fuel discharge member 30 including a main body 33 having fuel discharge outlets 31, an internal space 32, and a trailing edge 33a is shown. In this embodiment, the trailing edge 33a is inclined so that the base end of the trailing edge 33a extends further downstream from the tip end of the trailing edge 33a with respect to the air flow which is to be formed in the air flow passage. That is, the shape of the fuel discharge member 30 as viewed from the side is a tail assembly shape.

The internal space 32 communicates with the fuel passage in the fuel supply conduit 17 at the base end of the internal space 32. In the main body 33, the fuel discharge outlets 31 open toward a direction perpendicular to the air flow passage and communicate with the internal space 32. In FIG. 8A, on the opposite sides of the main body 33, two fuel discharge outlets 31 are arranged along an angular line with respect to the air flow and are staggered axially with respect to each other. Thus, four fuel discharge outlets 31 are disposed on the respective main bodies 33 so as to be axially displaced in relation to one another.

Figure 8B:
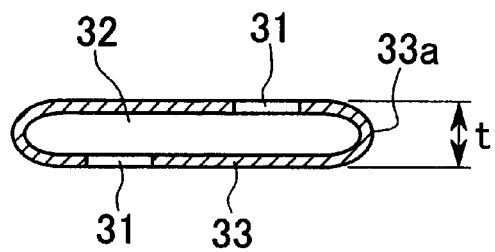
FIG. 8B is a cross-sectional view of the fuel discharge member, which is taken along the line C—C of FIG. 8A.

In this case, the main body 33 used is a flat tube wherein the cross-sectional shape is a flat oval shape of which both opposite sides are parallel to each other and both tip ends are connected to each other forming a curve, as shown in FIG. 8B. The thickness t of the main body 33 in a direction perpendicular to the air flow passage is set to be no more than 5 mm or to be thin enough such that the flow passage block ratio of the fuel discharge member is no more than 10% with respect to the cross-sectional area of the air flow passage in which the fuel discharge member 20 is to be placed. In this case, the thickness of the trailing edge 33a of the main body 33 becomes thin.

In FIG. 8A, four fuel discharge members 30 are disposed at intervals of 90° in the circumferential direction and protrude radially, and swirlers 18 are disposed at intervals of 45° in the circumferential direction downstream of the fuel discharge members 30 with respect to the air flow.

The cross-sectional shape of the main body 33 is not limited to the flat oval shape described above, and may be the cross-sectional shapes shown in FIGS 7A to 7E.

Figure 9A:
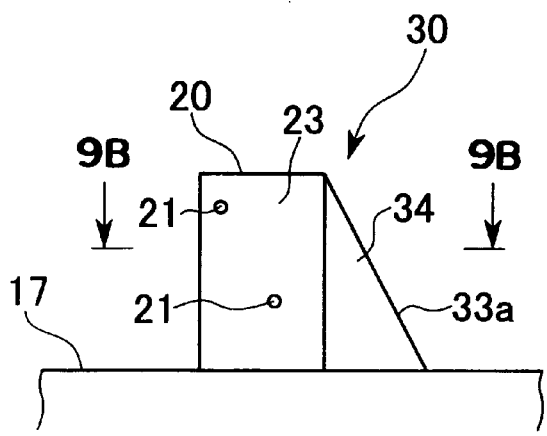
FIGS. 9A and 9B show a modified fuel discharge member according to the present invention.
Figure 9B:
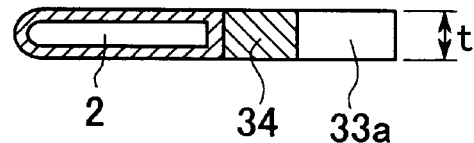

As shown in FIG. 9A, the trailing edge 33a may be formed with a detachable inclined member 34 of which the lateral shape is a triangle, so that the trailing edge 33a is inclined. This construction makes it easy to manufacture the fuel discharge member 30 whose trailing edge 33a is inclined.

Figure 10:
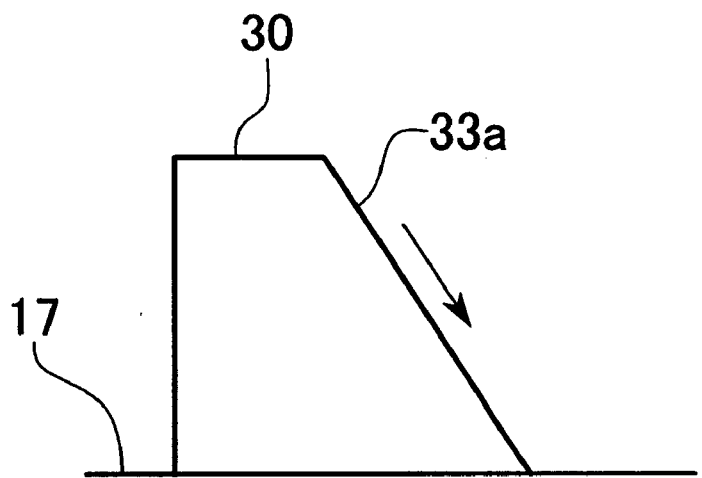
FIG. 10 is a schematic representation which illustrates the action of the second embodiment shown in FIG. 8A.

In the following, the effects of the fuel discharge member 30, whose trailing edge 33a is inclined, will be explained with reference to FIG. 10.

In general, a negative pressure area is formed downstream of the fuel discharge member 33, and thereby the air flow is swirled. In contrast, when the trailing edge 33a of the fuel discharge member 30 is inclined as shown in FIG. 10, the air flows from the base end of the fuel discharge member 30 along the incline of the trailing edge 33a, so that the air flow is prevented from being swirled. Thus, the concentration distribution of the fuel gas can be made uniform.

Since the fuel discharge member 30 is a flat tube, the fuel discharge outlets 31 are staggered axially. That is, one of the fuel discharge outlets 31, positioned axially upstream with respect to the air flow, is disposed near the tip end of the fuel discharge member 30. The other of the fuel discharge outlets 31, positioned axially downstream with respect to the air flow, is arranged near the base end of the fuel discharge member 30. The fuel gas can be uniformly discharged from both fuel discharge outlets 31, which are axially staggered. Therefore, even if the number of fuel discharge outlets 31 is increased, the radial penetration force is made uniform. Moreover, the radial concentration distribution of the fuel gas can be made uniform by inclining the trailing edge 33a as described above. The circumferential concentration distribution can easily be made uniform by increasing the number of fuel discharge members 30 and fuel discharge outlets 31.

Third Embodiment

Figure 11A:
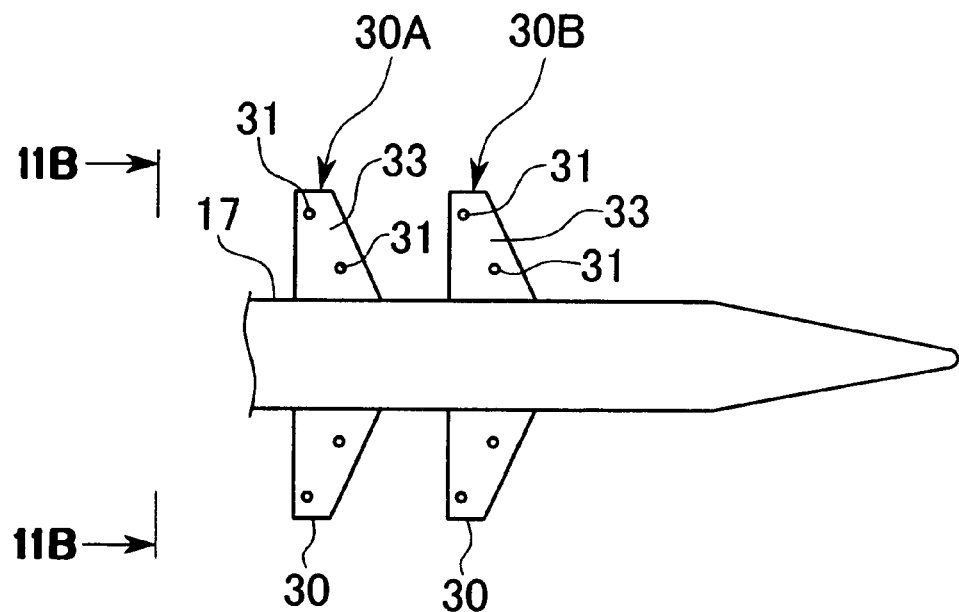
FIGS. 11A and 11B show a fuel discharge member of a third embodiment according to the present invention.

In the third embodiment, the fuel discharge members 30 are disposed on the fuel supply conduit 17 in a plurality of lines along the axial direction of the fuel supply conduit 17 (along the flow direction of the air). In FIG. 11A, the fuel discharge members 30 are axially arranged in two lines.

Figure 11B:
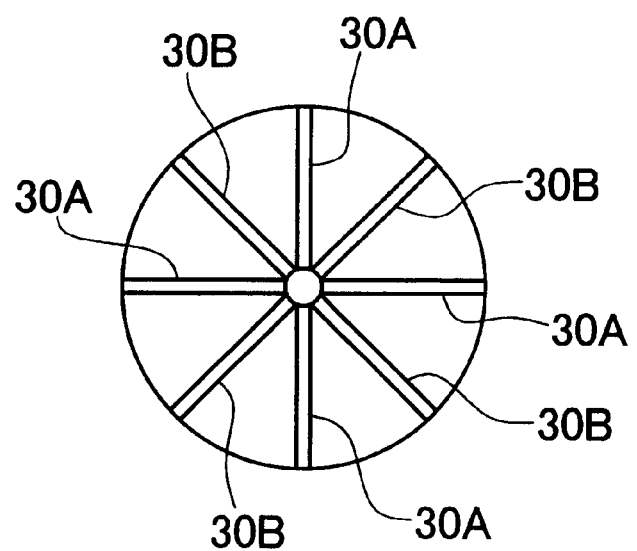

In this case, a fuel discharge member 30A located upstream and a fuel discharge member 30B located downstream may be arranged at the same position circumferentially and protrude radially. Alternatively, the fuel discharge members 30A and 30B may be staggered circumferentially as shown in FIG. 11B.

When the plurality of fuel discharge members 30 are respectively arranged at the same positions circumferentially as described above, the effective area of the air flow passage in which the plurality of fuel discharge members 30 are to be placed hardly changes compared to the effective area in which only one fuel discharge member 30 is to be placed. Therefore, the number of fuel discharge outlets 31 to be provided can be increased while maintaining the effective area of the air flow passage, and the circumferential concentration distribution of the fuel gas can be made uniform.

When the plurality of fuel discharge members 30 are staggered circumferentially, the interval which circumferentially separates the fuel discharge outlets 31 from each other becomes small in accordance with the increase in the number of fuel discharge outlets 31. Therefore the circumferential concentration distribution of the fuel gas can be made more uniform.

Fourth Embodiment

Figure 12A:
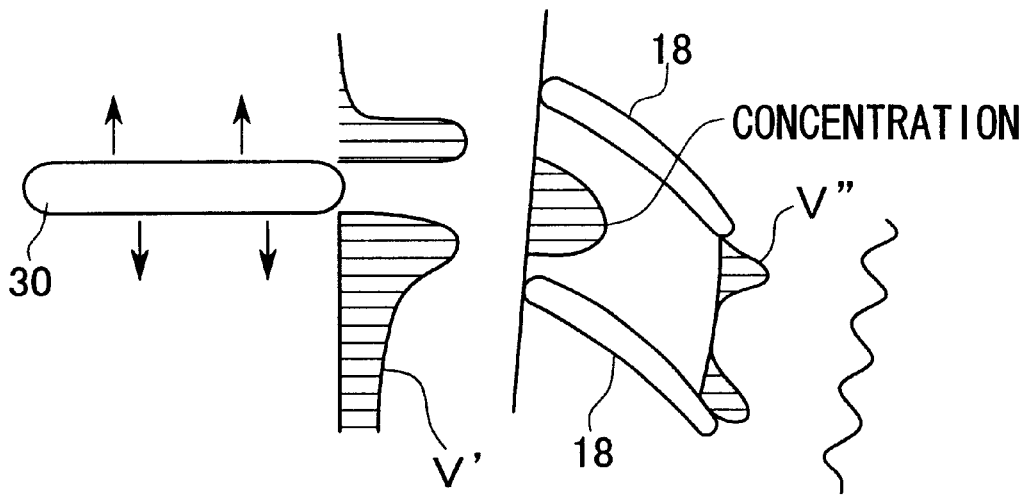
FIGS. 12A and 12B show the relationship between the fuel discharge member and swirlers of a fourth embodiment according to the present invention.
Figure 12B:
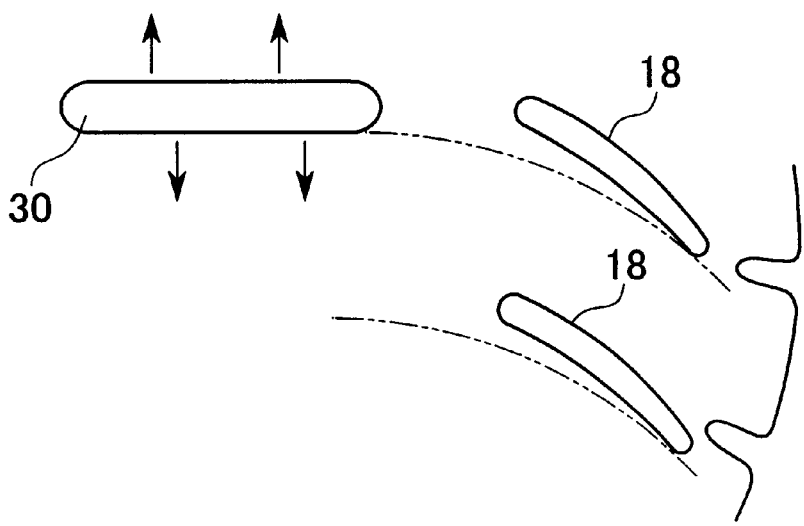

In the fourth embodiment shown in FIGS. 12A and 12B, the relationship between the fuel discharge member 30 and the swirlers 18 is described.

In FIG. 12A, the fuel discharge member 30 and the swirlers 18 are staggered circumferentially. That is, the fuel discharge member 30 is disposed upstream of a position which is located between adjacent swirlers 18. In this case, the intensity of the turbulence of flow velocity v' is enlarged in accordance with the proximity to the fuel discharge member 30, as shown in FIG. 12A. The fuel gas is engulfed in swirls generated downstream of the fuel discharge member 30 so that the fuel gas becomes concentrated. In contrast, the intensity of the turbulence of flow velocity v" is generated downstream of the swirlers 18, as shown in FIG. 12A. The turbulence of flow velocity v" interacts with the turbulence of flow velocity v', so that the distribution of the turbulence of the flow velocity becomes uniform downstream of the swirlers 18. Then, a premixed gas, wherein the fuel gas is discharged into the air, is mixed by this uniform turbulence of the flow velocity, so that the concentration distribution of the fuel gas becomes uniform.

In FIG. 12B, the fuel discharge member 30 and one of the swirlers 18 are aligned circumferentially. That is, the fuel discharge member 30 is located circumferentially upstream of the swirlers 18. In this case, positions of the turbulence of flow velocity v' caused by the fuel discharge member 30 and the turbulence of flow velocity v" caused by the swirlers 18 are circumferentially consistent with each other, so that effects caused by the fuel discharge member 30 at the downstream side can be suppressed. That is, the turbulence of the flow velocity caused by the fuel discharge member 30 is substantially negligible.

Fifth Embodiment

Figure 13:
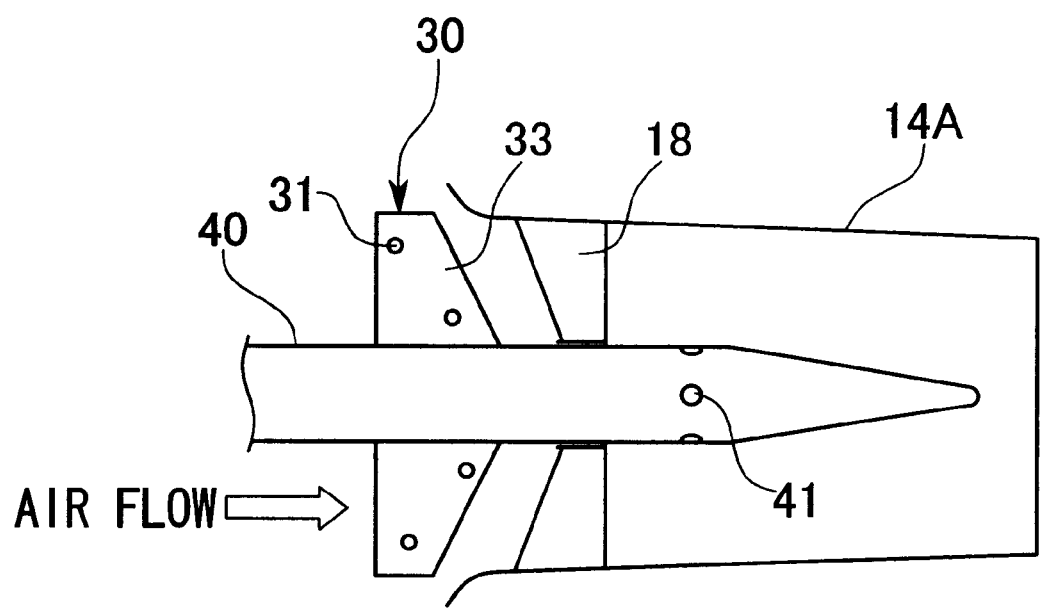
FIG. 13 is a cross-sectional view which shows a burner according to a fifth embodiment of the present invention.

In FIG. 13, a burner 14A including a fuel supply conduit 40, fuel discharge members 30, and swirlers 18 according to the fifth embodiment are shown. In the fuel supply conduit 40, a fuel passage (not shown), a liquid fuel passage (not shown), and fuel discharge outlets 41 are formed. The fuel passage is formed so as to communicate with a fuel gas supply source to supply the fuel gas to the fuel discharge members 30. The liquid fuel passage is formed so as to communicate with a liquid fuel supply source to supply liquid fuel to the fuel discharge outlets 41. The fuel discharge outlets 41 are formed so as to communicate with the liquid fuel passage substantially at the tip end portions of the fuel supply conduit 40. The fuel discharge outlets 41 open toward the downstream direction of the swirlers 18 with respect to the air flow.

By the use of this burner 14A, premixed gas, wherein the concentration of the fuel gas is uniform, can be formed in the same manner as described above.

As described above, by using fuel discharge member 20 or 30, the concentration distribution of the fuel gas in the premixed gas, wherein air and fuel gas are mixed, can be made circumferentially and radially uniform, so that the area in which the concentration of the fuel gas is high, that is, the fuel/air ratio is over 1, can be reduced. When the concentration distribution of the fuel gas is made uniform, even if the temperature for combustion is raised to near 1600° C., the amount of NOx generated during the combustion can be reduced.

Thus, by using the combustor 10 having the premixing nozzle 12 and the punched metal plate 42, the total amount of NOx generated and the combustion oscillation can be reduced. Moreover, a gas turbine and a jet engine, which include the combustor 10, can reduce the amount of NOx generated and the combustion oscillation, even if the temperature for the combustion is raised to operate with high effectiveness. Particularly, when the trailing edge of the fuel discharge member 20 or 30 is set to be thin enough such that the thickness thereof is no more than 5 mm or the flow passage block ratio of the fuel discharge member is no more than 10% with respect to the cross-sectional area of the air flow passage in which the fuel discharge member is to be placed, the generation of NOx can be reduced so that the concentration of NOx exhaust is no greater than the 25 ppm restriction value in the United States.

Although the fuel discharge outlets 21 and 31 are respectively disposed in the fuel discharge members 20 and 30 perpendicular or approximately perpendicular to the air flow passage, the fuel discharge outlets according to the present invention may be disposed downstream of the fuel discharge members with respect to the direction of the air flow.

Although the swirlers 18 are preferably disposed downstream of the fuel discharge members 20 or 30, the swirlers may be disposed upstream of the fuel discharge members.

Although the fuel discharge members are disposed in the main burner of the premixing nozzle in the respective embodiments described above, the fuel discharge members may be disposed in a pilot burner.

Sixth Embodiment

Figure 14:
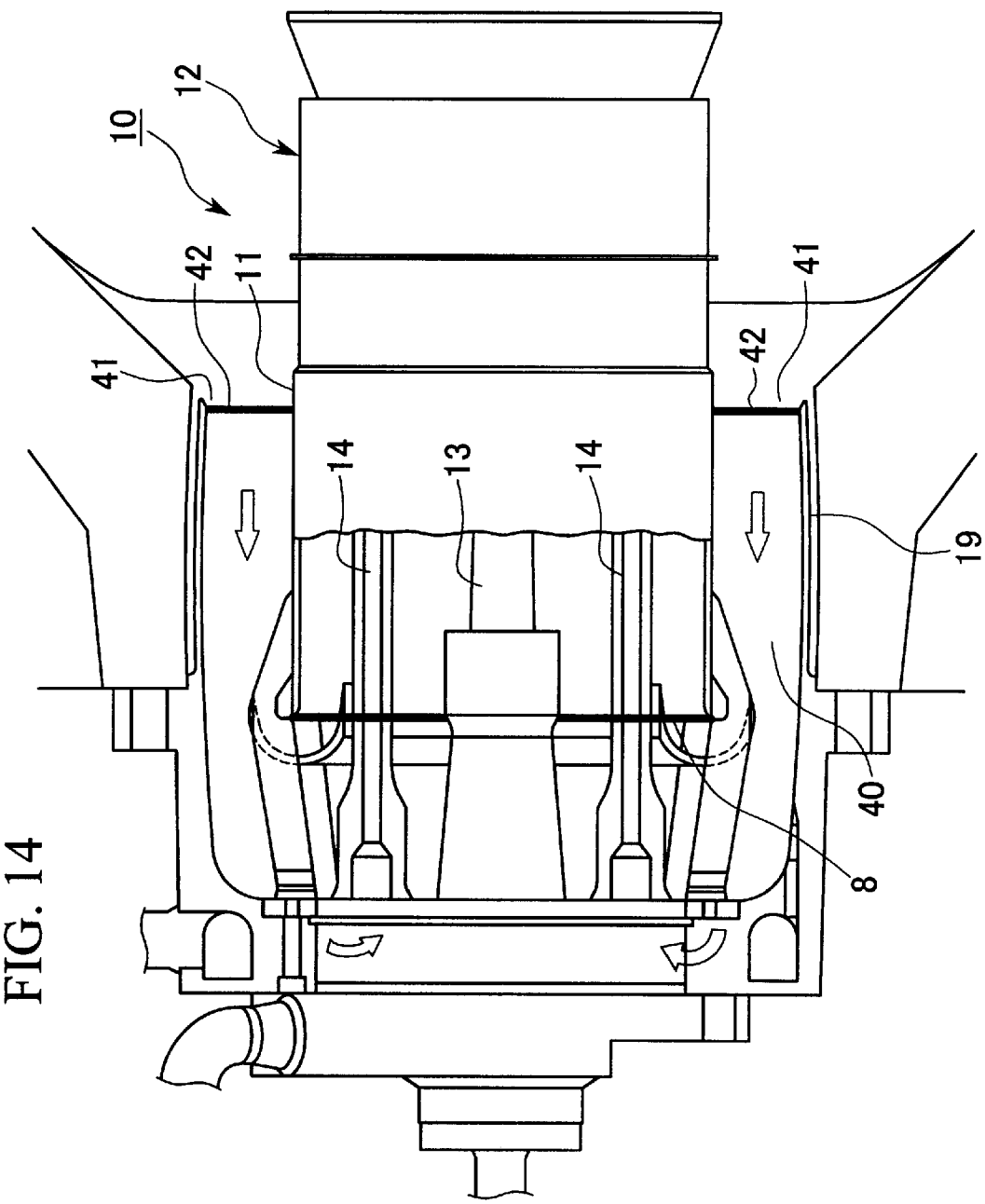
FIG. 14 is a cross-sectional view of a key portion of a combustor of a sixth embodiment according to the present invention.

In the following, a combustor of the sixth embodiment, which includes a velocity fluctuation absorption member, will be explained with reference to FIG. 14. In FIG. 14, a combustor 10, an internal cylinder 11, a premixing nozzle 12, a pilot burner 13, a main burner 14, an external cylinder 19, and an air flow passage 40 are shown.

In FIG. 14, a punched metal plate 42 is disposed as the velocity fluctuation absorption member at an inlet 41 of the air flow passage 40, and a straightening plate 8 is disposed perpendicularly to the air flow on the air flow passage 40 between the internal cylinder 11 and the external cylinder 19.

By using the combustor, the air flow is firstly made uniform with the punched metal plate 42. Then, the air flow is further made uniform by the straightening plate 8. Therefore, the axial velocity of the air flow can be made uniform, and the flame temperature in the combustor 10 is also made uniform. Thereby, the amount of NOx exhaust is effectively reduced. By contrast, combustion oscillation tends to be generated when the premixed air is made uniform. However, pressure waves of the combustion oscillation are reduced by the punched metal plate 42, so that resonation of the pressure waves and the acoustic system is prevented.

Seventh Embodiment

Figure 15A:
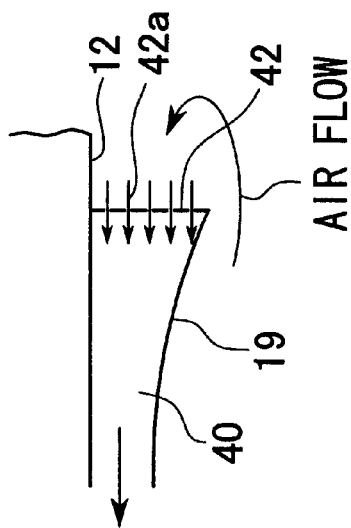
FIGS. 15A to 15C are schematic cross-sectional views of a combustor of a seventh embodiment according to the present invention.
Figure 15C:
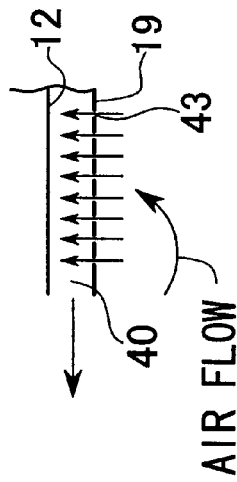
Figure 15B:
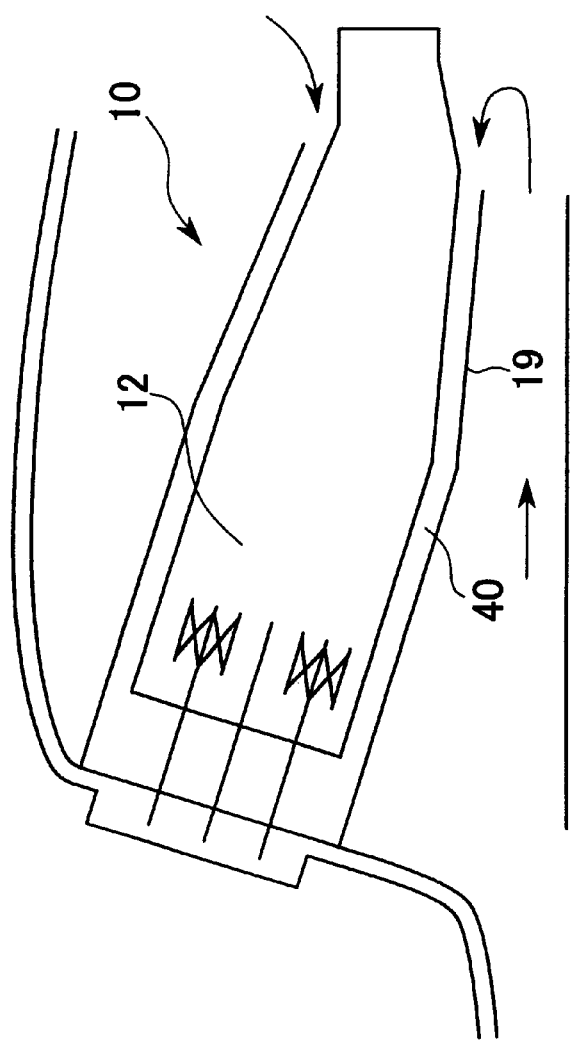

In the following, a combustor of the seventh embodiment, which includes the velocity fluctuation absorption member, will be explained with reference to FIGS. 15A to 15C. In the seventh embodiment, the combustor 10 is formed by providing a punched metal plate 42 with a gas turbine combustor which is disclosed in Japanese Unexamined Patent Application, First Publication No. Hei 6-18037. The combustor 10 includes a premixing nozzle 12, an external cylinder 19 and the air flow passage 40. A plurality of small through holes is formed on both sides of the external cylinder 19, so as to communicate with the air flow passage 40 and to supply a cooling air to both sides of the premixing nozzle 12 through the air flow passage 40. The cooling air is supplied in order to decrease the temperature of the premixing nozzle 12. The flow direction of the cooling air is perpendicular to the air flow direction which is supplied to the air flow passage 40 through the punched metal plate 42. The diameter of the cross-sectional area of an inlet of the air flow passage 40 is set to be enlarged from the downstream side of the inlet so that the loss of the air supplied from the compressor is prevented. The diameter of the cross-sectional area of the air flow passage 40 is set to be narrow in order to cool the premixing nozzle 12 with high effectiveness. In the inlet of the air flow passage 40, the punched metal plate 42 is disposed as a velocity fluctuation absorption member. With the punched metal plate 42, the air flow is made uniform, and the axial velocity of the air flow is made uniform. The flame temperature in the combustor 10 is also made uniform, so that the amount of NOx exhaust is effectively reduced. By contrast, combustion oscillation tends to be generated when the premixed air is made uniform. However, pressure waves of the combustion oscillation are reduced by the punched metal plate 42 so that resonation of the pressure waves and the acoustic system is prevented.

Eighth Embodiment

Figure 16:
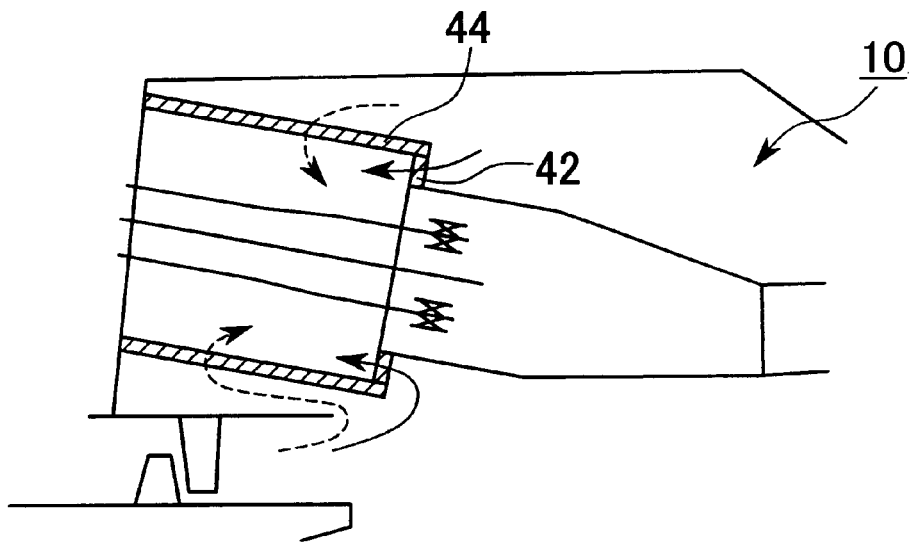
FIG. 16 is a cross-sectional view of a key portion of a combustor of an eighth embodiment according to the present invention.

In the following, a combustor of the eighth embodiment which includes a velocity fluctuation absorption member, will be explained with reference to FIG. 16. In FIG. 16, the combustor 10 is further equipped with a cylindrical member 44 shown by hatching. The cylindrical member 44 is a circular cylinder of which one end is closed. The other end of the cylindrical member 44 is provided with the punched metal plate 42 as the velocity fluctuation absorption member at the maximum velocity fluctuation position on the air flow passage. The cylindrical member 44 accommodates the external cylinder. Thereby, the air flow direction shown by broken arrows is prevented so that the air flow is supplied from the compressor to the combustor 10 through the punched metal plate 42 as shown by solid arrows. Therefore, the air flow is made uniform by the punched metal plate 42 so that the axial velocity of the air flow can be made uniform, and the flame temperature in the combustor 10 is also made uniform. Thereby, the amount of NOx exhaust is reduced with high effectiveness. By contrast, the pressure waves caused by combustion oscillation are reduced with the punched metal plate 42 so that resonation of the pressure waves and the acoustic system is prevented.

Ninth Embodiment

Figure 17:
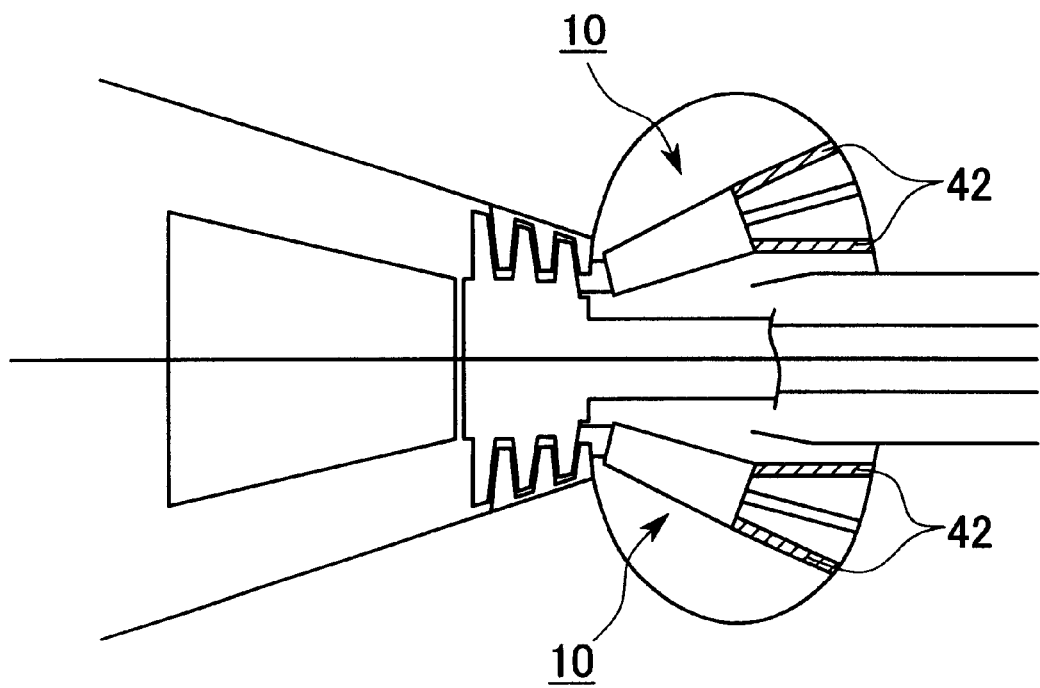
FIG. 17 is a cross-sectional view of a key portion of a combustor of a ninth embodiment according to the present invention.

In the following, a combustor of the ninth embodiment, which includes a velocity fluctuation absorption member, will be explained with reference to FIG. 17. In FIG. 17, two combustors, of which the configurations are the same, are shown. The combustor includes a combustion chamber, an air flow passage, and a velocity fluctuation absorption member 42. The velocity fluctuation absorption members 42 are disposed at a maximum velocity fluctuation position on the air flow passage whereat the velocity fluctuation of the air flow reaches the maximum and so as to surround the combustion chamber. Thereby, the air flow is made uniform by the velocity fluctuation absorption members 42, and then is supplied to the combustion chamber. Thereby, the flame temperature in the combustor 10 is made uniform, so that the amount of NOx exhaust is reduced with high effectiveness. Moreover, pressure waves of combustion oscillation are reduced by the fluctuation absorption members 42 so that resonation of the pressure waves and the acoustic system is prevented.

Tenth Embodiment

Figure 18:
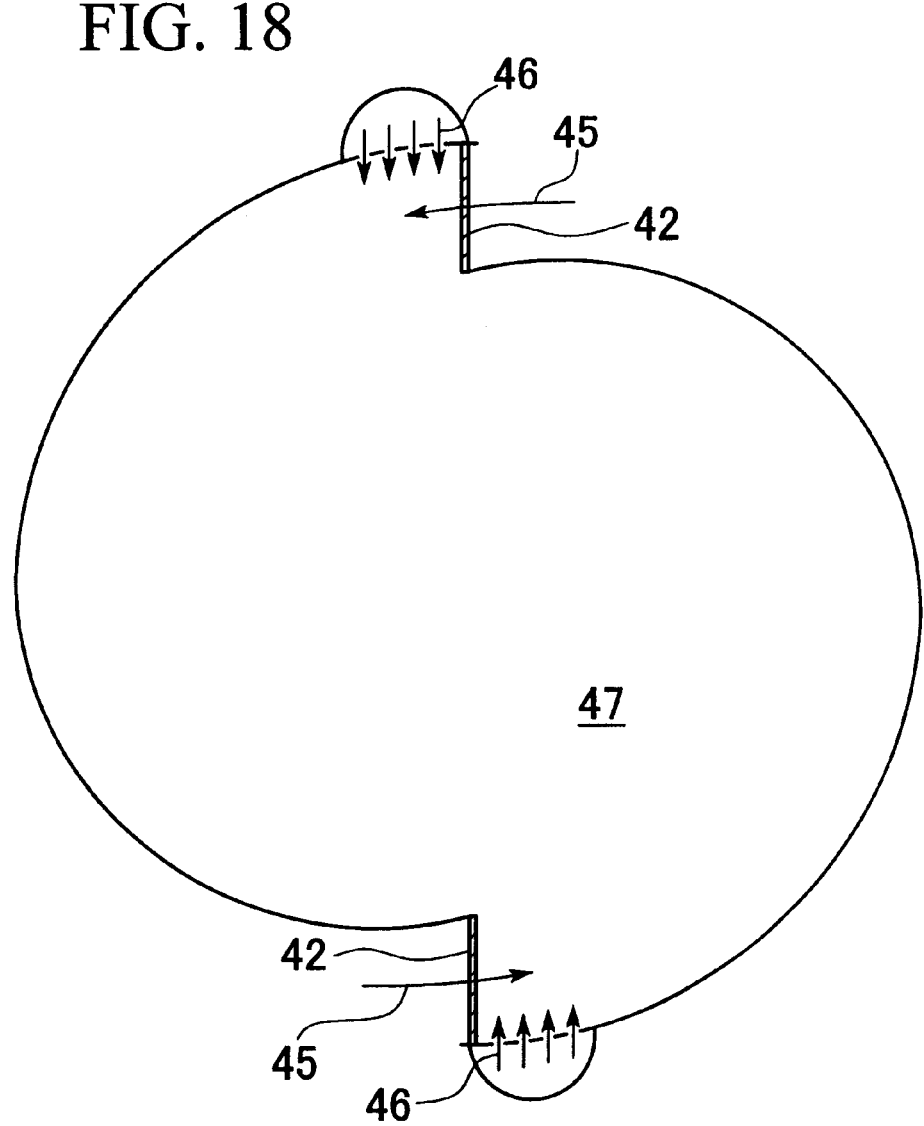
FIG. 18 is a cross-sectional view of a key portion of a combustor of a tenth embodiment according to the present invention.

In the following, a combustor of the tenth embodiment which includes a velocity fluctuation absorption member, will be explained with reference to FIG. 18. In FIG. 18, the combustor includes a combustion chamber 47, a fuel gas supply conduit, an atomizing nozzle, an air flow passage, and a velocity fluctuation absorption member 42. The combustion chamber 47 is a conical chamber wherein a liquid fuel is sprayed from the atomizing nozzle. The atomizing nozzle is disposed at one side of the combustion chamber 47 to atomize the liquid fuel to the combustion chamber 47. The air flow passages are formed on the combustion chamber 47 so that the air is supplied to the combustion chamber 47 through diametrically opposed slots in the side of the combustion chamber 47 as shown by arrows 45. The fuel gas supply conduits are disposed on the edges of the slots of the air flow passage and have a plurality of fine through holes from which a fuel gas is supplied to the combustion chamber 47 as shown by arrows 46. The velocity fluctuation absorption members 42 are disposed on both inlets of the air flow passages whereat the velocity fluctuation reaches the maximum. Thereby, the air flow is made uniform by the velocity fluctuation absorption members 42 so that the amount of NOx exhaust is reduced with high effectiveness. Moreover, pressure waves of combustion oscillation are reduced by the fluctuation absorption members 42 so that resonation of the pressure waves and the acoustic system is prevented.

The combustor 10, the premixing nozzle 12, the main burner 14, the gas turbine, and the jet engine are not limited by the embodiments described above. The number of pilot burners 13 and main burners 14 disposed in the premixing nozzle 12 or the number of fuel discharge members protruding from the main burner 14 may be suitably selected, for example.

It is understood, by those skilled in the art, that the foregoing description is a preferred embodiment of the disclosed configurations and that various changes and modifications may be made to the invention without departing from the spirit and scope thereof.

The following effects can be obtained by the present invention.

By using a combustor which is provided with the velocity fluctuation absorption member near the inlet of the air flow passage wherein the velocity fluctuation of the air flow reaches the 37 maximum, the pressure waves of combustion oscillation and the turbulence of the air flow, which supplied from the compressor through the fluctuation absorption member, is reduced. Thereby, reduction of NOx emission and stable operation of the combustor are achieved.

The velocity fluctuation absorption member can make the air flow uniform so that the velocity of the air flow is made uniform and the turbulence of the air flow is reduced. Thereby, the concentration distribution of the premixed air and the temperature of flames caused by the premixed air are made uniform so that the amount of NOx exhaust can be reduced.

Moreover, the velocity fluctuation absorption member can also reduce the propagation of the pressure waves of the combustion oscillation which is caused by the combustion of the premixed air in which the concentration distribution is made uniform. The velocity fluctuation absorption member also works as an acoustic damper which reduces the internal pressure fluctuation to prevent resonation of the combustion oscillation and the acoustic system so that stable operation of the combustor can be achieved. By adjusting the length of the top hat (the external cylinder) to change the oscillation frequency of the top hat without causing the resonation with the oscillation frequency of the combustion, oscillation during the combustion can be prevented.

By using the combustor, the reduction of the NOx emission and the combustion can be reduced at the same time.

By using the gas turbine and the jet engine having the combustor, reduction of both the amount of NOx exhaust and combustion oscillation can be achieved at the same time so that environmental pollution can be reduced and the endurance thereof can be improved.

What is claimed is:

1. An apparatus comprising:
   a combustor comprising:
      a combustion unit;
      an air flow passage through which air is supplied from a compressor to said combustion unit;
      wherein said air flow passage is structured and arranged so that air supplied from the compressor to said combustion unit through said air flow passage has a maximum velocity fluctuation position in said air flow passage at which velocity fluctuation of the air flow becomes maximum; and
      a velocity fluctuation absorption member provided in said air flow passage near said maximum velocity fluctuation position.

2. The apparatus of claim 1, wherein said velocity fluctuation absorption member is disposed in the vicinity of said maximum velocity fluctuation position in said air flow passage in a range of $+/-\frac{1}{8}\lambda$ from said position, wherein $\lambda$ is a wavelength of the velocity fluctuation.

3. The apparatus of claim 1, said velocity fluctuation absorption member comprises a member operable to cause a pressure loss in the air flow and selected from the group consisting of a punched metal plate, a net member and a porous plate.

4. The apparatus of claim 1, wherein said velocity fluctuation absorption member has apertures therein and wherein an aperture ratio of said velocity fluctuation absorption member is no less than 35% with respect to the cross-sectional area of said velocity fluctuation absorption member in which said apertures are formed.

5. The apparatus of claim 1, wherein said apparatus is a gas turbine comprising:
   a compressor which compresses air to generate high-pressure gas;
   said combustor being connected to said compressor so as to be supplied with the high-pressure gas from said compressor, said combustor being operable to heat the high-pressure gas to generate a high-temperature and high-pressure gas; and
   a turbine connected to said combustor so as to be supplied with the high-temperature and high-pressure gas from said combustor, said turbine being operable to rotate an output shaft by expanding the high-temperature and high-pressure gas to generate shaft output.

6. The apparatus of claim 1, wherein said apparatus is a jet engine comprising:
   a compressor which compresses air to generate a high-pressure gas;
   said combustor being connected to said compressor so as to be supplied with the high-pressure gas from said compressor, said combustor being operable to heat the high-pressure gas to generate a high-temperature and high-pressure gas; and a turbine connected to said combustor so as to be supplied with the high-temperature and high-pressure gas from said combustor.

7. An apparatus comprising:
a combustor comprising:
   a premixing nozzle;
   a first cylindrical member having said premixing nozzle therein;
   a second cylindrical member having said first cylindrical member therein;
   an air flow passage through which air is supplied from a compressor to said premixing nozzle, wherein said air flow passage is located in said second cylindrical member and is structured and arranged so that air supplied from the compressor to said premixing nozzle through said air flow passage has a maximum velocity fluctuation in said air flow passage at which velocity fluctuation of the air flow becomes maximum; and
   a velocity fluctuation absorption member provided in said air flow passage near said maximum velocity fluctuation position.

8. The apparatus of claim 7, wherein said velocity fluctuation absorption member is disposed in the vicinity of said maximum velocity fluctuation position in said air flow passage in a range of +/−⅛λ from said position, wherein λ is a wavelength of the velocity fluctuation.

9. The apparatus of claim 7, wherein said air flow passage has an inlet and said velocity fluctuation absorption member is disposed at said inlet.

10. The apparatus of claim 7, said velocity fluctuation absorption member comprises a member operable to cause a pressure loss in the air flow and selected from the group consisting of a punched metal plate, a net member and a porous plate.

11. The apparatus of claim 7, wherein said velocity fluctuation absorption member has apertures therein and wherein an aperture ratio of said velocity fluctuation absorption member is no less than 35% with respect to the cross-sectional area of said velocity fluctuation absorption member in which said apertures are formed.

12. The apparatus of claim 7, wherein said air flow passage comprises a straightening member in said air flow passage operable to make the air flow uniform in said air flow passage.

13. The apparatus of claim 7, wherein said premixing nozzle comprises a fuel discharge member fixed on a fuel supply conduit in said air flow passage, said fuel discharge member comprising:

a main body having an internal space communicating with a fuel passage in said fuel supply conduit;
   fuel discharge outlets communicating with said internal space; and
   a characteristic selected from the group consisting of having a thickness of a trailing edge of said fuel discharge member be no more than 5 mm and a flow passage blocking ratio that is no more than 10% with respect to the cross-sectional area of said air flow passage.

14. The apparatus of claim 7, wherein said premixing nozzle comprises a fuel discharge member fixed on a fuel supply conduit, said fuel discharge member comprising:

a main body having an internal space communicating with a fuel passage in said fuel supply conduit;
   fuel discharge outlets communicating with said internal space; and
   a trailing edge, wherein said main body is a flat tube.

15. The apparatus of claim 7, wherein said apparatus is a gas turbine comprising:

a compressor which compresses air to generate high-pressure gas;
   said combustor being connected to said compressor so as to be supplied with the high-pressure gas from said compressor, said combustor being operable to heat the high-pressure gas to generate a high-temperature and high-pressure gas; and
   a turbine connected to said combustor so as to be supplied with the high-temperature and high-pressure gas from said combustor, said turbine being operable to rotate an output shaft by expanding the high-temperature and high-pressure gas to generate shaft output.

16. The apparatus of claim 7, wherein said apparatus is a jet engine comprising:

a compressor which compresses air to generate a high-pressure gas;
   said combustor being connected to said compressor so as to be supplied with the high-pressure gas from said compressor, said combustor being operable to heat the high-pressure gas to generate a high-temperature and high-pressure gas; and
   a turbine connected to said combustor so as to be supplied with the high-temperature and high-pressure gas from said combustor.

* * * * *